(12) United States Patent
Park et al.

(10) Patent No.: US 11,511,218 B2
(45) Date of Patent: Nov. 29, 2022

(54) COOLING WATER STIRRER AND WATER PURIFIER HAVING THE SAME

(71) Applicant: LG ELECTRONICS INC., Seoul (KR)

(72) Inventors: Jongwoo Park, Seoul (KR); Sangjoon Lee, Seoul (KR); Seonwoong Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 414 days.

(21) Appl. No.: 15/679,728

(22) Filed: Aug. 17, 2017

(65) Prior Publication Data

US 2018/0056217 A1 Mar. 1, 2018

(30) Foreign Application Priority Data

Aug. 23, 2016 (KR) .................. 10-2016-0106890

(51) Int. Cl.
*B01D 35/30* (2006.01)
*B01F 23/234* (2022.01)
(Continued)

(52) U.S. Cl.
CPC .... *B01D 35/306* (2013.01); *B01F 23/234211* (2022.01); *B01F 27/07261* (2022.01); *B01F 27/112* (2022.01); *B01F 27/117* (2022.01); *B01F 27/1171* (2022.01); *B01F 27/81* (2022.01); *B01F 35/93* (2022.01);
(Continued)

(58) Field of Classification Search
CPC .. B01D 35/306; B01F 3/0478; B01F 7/00166; B01F 7/0025; B01F 7/00541; B01F 7/0055; B01F 7/1625; B01F 15/066; B01F 2015/061; F25D 11/025; B67D 1/0004; B67D 1/0014; B67D 2001/0093; B67D 1/0859; B67D 1/0862; B67D 1/0884; B67D 1/0888; B67D 1/0895; B67D 1/125; B67D 1/16; B67D 2210/0001;
(Continued)

(56) References Cited

U.S. PATENT DOCUMENTS 4,137,737 A * 2/1979 Robandt, II ............ D06F 17/10
68/134
5,797,519 A 8/1998 Schroeder et al.
(Continued)

FOREIGN PATENT DOCUMENTS

CN 201680748 U * 12/2010 ............ F28D 1/047
FR 2 496 854 6/1982
(Continued)

OTHER PUBLICATIONS

CCD Report, Common Citatation Document for US201715679728, accessed on the Internet at http://ccd.fiveipoffices.org/CCD-2.2.0/ on Sep. 20, 2019, 1 page. (Year: 2019).*
(Continued)

*Primary Examiner* — Jonathan M Peo
(74) *Attorney, Agent, or Firm* — KED & Associates, LLP

(57) ABSTRACT

A stirrer includes a stirring shaft; a plurality of mixing wings extending from the lower end of the stirring shaft and spaced from each other around the stirring shaft; and a conical hub connecting the lower ends of the mixing wings.

22 Claims, 15 Drawing Sheets

(51) Int. Cl.
    *B01F 27/81*         (2022.01)
    *B01F 27/112*      (2022.01)
    *B01F 27/117*      (2022.01)
    *B01F 27/072*      (2022.01)
    *B01F 35/93*        (2022.01)
    *F25D 11/02*        (2006.01)
    *B67D 1/16*         (2006.01)
    *B67D 1/12*         (2006.01)
    *B67D 1/08*         (2006.01)
    *B67D 1/00*         (2006.01)
    *B01F 35/90*        (2022.01)

(52) U.S. Cl.
CPC ........ *F25D 11/025* (2013.01); *B01F 2035/98* (2022.01); *B67D 1/0004* (2013.01); *B67D 1/0014* (2013.01); *B67D 1/0859* (2013.01); *B67D 1/0862* (2013.01); *B67D 1/0884* (2013.01); *B67D 1/0888* (2013.01); *B67D 1/0895* (2013.01); *B67D 1/125* (2013.01); *B67D 1/16* (2013.01); *B67D 2001/0093* (2013.01); *B67D 2210/0001* (2013.01); *B67D 2210/00031* (2013.01); *B67D 2210/00099* (2013.01); *B67D 2210/00102* (2013.01)

(58) Field of Classification Search
CPC ........... B67D 2210/00031; B67D 2210/00099; B67D 2210/00102
See application file for complete search history.

(56) References Cited

U.S. PATENT DOCUMENTS

| | | | | |
|---|---|---|---|---|
| 10,322,943 B2 * | 6/2019 | Park | ......................... | C02F 9/005 |
| 10,408,533 B2 * | 9/2019 | Kim | ......................... | B01D 1/28 |
| 10,472,221 B2 * | 11/2019 | Park | ..................... | B67D 1/0864 |
| 10,473,380 B2 * | 11/2019 | Park | ..................... | F28F 13/125 |
| 10,501,305 B2 * | 12/2019 | Park | ..................... | B67D 1/0014 |
| 10,882,727 B2 * | 1/2021 | Park | ..................... | F25D 23/006 |
| 10,962,282 B2 * | 3/2021 | Kim | ......................... | B01D 1/28 |
| 2016/0339401 A1 * | 11/2016 | Hoefken | ............ | B01F 7/00541 |
| 2017/0153056 A1 * | 6/2017 | Kim | ..................... | B01D 35/30 |
| 2018/0016128 A1 * | 1/2018 | Park | ..................... | B67D 1/0864 |
| 2018/0016129 A1 * | 1/2018 | Park | ..................... | B67D 1/0864 |
| 2018/0029899 A1 * | 2/2018 | Park | ......................... | C02F 1/003 |
| 2018/0056217 A1 * | 3/2018 | Park | ..................... | B01D 35/306 |
| 2019/0256372 A1 * | 8/2019 | Park | ......................... | C02F 1/003 |
| 2019/0346201 A1 * | 11/2019 | Kim | ..................... | F25D 31/005 |
| 2020/0399109 A1 * | 12/2020 | Park | ......................... | B67D 1/08 |
| 2020/0399872 A1 * | 12/2020 | Park | ......................... | E03C 1/044 |

FOREIGN PATENT DOCUMENTS

| | | | | | |
|---|---|---|---|---|---|
| JP | 2001072195 | A | * | 3/2001 | ............... B67D 1/08 |
| JP | 4540046 | | | 9/2010 | |
| KR | 200447286 | Y1 | * | 1/2010 | ............. B01F 7/003 |
| KR | 10-2011-0065979 | | | 6/2011 | |
| KR | 20110068250 | A | * | 6/2011 | ........... B01D 35/185 |
| KR | 10-1200034 | | | 11/2012 | |
| KR | 101200034 | B1 | * | 11/2012 | ................ B01F 7/16 |
| KR | 20150019118 | A | * | 2/2015 | ........... B67D 1/0084 |
| KR | 10-2016-0096679 | | | 8/2016 | |
| WO | WO-2015086212 | A1 | * | 6/2015 | ........ B01F 15/00824 |

OTHER PUBLICATIONS

India Office Action dated Dec. 7, 2021 issued in IN Application No. 201714029776.

* cited by examiner

COOLING WATER STIRRER AND WATER PURIFIER HAVING THE SAME

CROSS-REFERENCE TO RELATED APPLICATION(S)

This application claims priority to Korean Patent Application No. 10-2016-0106890 filed on Aug. 23, 2016 in Korea, and the contents of which are hereby incorporated by reference in its entirety under Articles 119 (35) and 365 (35) of the U.S. Patent Law.

BACKGROUND

1. Field

The present disclosure relates to a cooling water stirrer and a water purifier having the same.

2. Background

A water purifier is a machine that filters undesirable substances such as dirt or heavy metals in drinking water using a physical treatment and/or a chemical treatment. An example of a water purifier structure is described in Korean Patent Application Publication No. 10-2011-0065979 (published on Jun. 16, 2011). This water purifier is a direct water purifier that includes a tank holding water or other heat-exchanging fluid, and positions a cold water pipe and an evaporator within the tank. Refrigerant in the evaporator cools the water within the tank through a first heat exchange, and purified water in the cold water coil is cooled by a second heat exchange with the cooled water in the tank.

In this water purifier, a stirrer is operated to generate a water flow in the cooling tank to promote the heat exchanges between the cooling water, the refrigerant, and the purified water flowing through the cold water pipe. For example, when the stirrer is operated, the temperature of the cooling water is maintained at more uniform levels throughout the tank so that the heat exchanges are accelerated. The stirrer is connected at one end to a stirring motor, and blades are formed at another end of the stirring shaft to generate a water flow when the stirrer is operated by the stirring motor. The blades may be classified, for example, as an axial-flow blade, a radial-flow blade, an axial radial-flow blade, or a mixed blade in accordance with the shapes of the blades and the resulting water currents caused by the blades when the stirrer is operated.

In one example, a stirrer may use axial radial-flow blades (i.e., blades that causes cooling water in the tank to move in an axial direction associated with the stirring shaft) to reduce noise due to resonance during the operation of stirrer. However, the axial radial-flow blades generate a water flow in which the cooling water moves down toward a bottom of a cooling water tank and rapidly slows such that minimal water movement occurs in certain areas of the water tank, and the overall cooling performance is reduced. Further, the axial radial-flow blades still generate some resonance noise by shaking when a stirrer is rotated.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

A cooling water stirrer and a water purifier having the stirrer according to embodiments of the present disclosure are described hereafter in detail with reference to the drawings.

Figure 1:
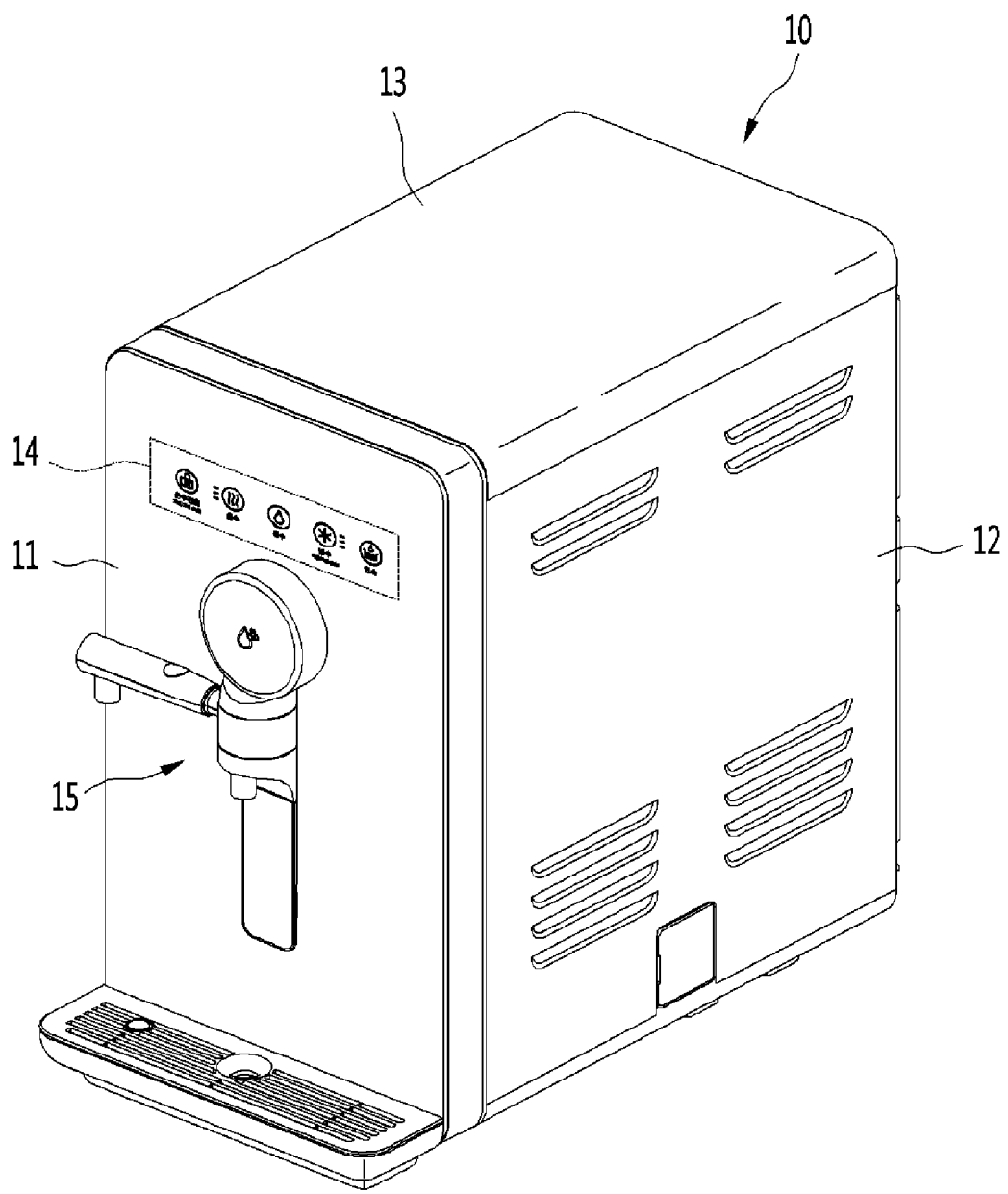
FIG. 1 is a perspective view of a water purifier according to a first embodiment of the present disclosure.

FIG. 1 is a perspective view of a water purifier according to a first embodiment of the present disclosure. Referring to FIG. 1, a water purifier 10 according to a first embodiment of the present disclosure is a direct hot and cold water purifier that selectively dispenses cold water or hot water. For example, the water purifier 10 may purify (or filter) water received from an external water source and may then heat or cool the purified water. As used herein, a "direct water purifier" is a water purifier that directly dispenses purified water to a user without storing the purified water within a tank. The direct water purifier may include a tank for holding other fluids, such as water that is used to cool the purified water.

An external shape or appearance of the water purifier 10 may be formed by combining a plurality of panels. In detail, the water purifier 10 may have a substantially cube or rectangular shape formed by combining a front panel 11 for a front surface, side (or lateral) panels 12 for side surfaces, a top panel 13 for a top surface, a rear panel for a rear surface, and a base (or bottom) panel for the bottom surface. Various parts for purifying water may be provided in an internal space defined by combining the panels.

An operation display unit (or user interface) 14 that allows a user to input instructions for operating the water purifier 10 and displays information regarding operation states of the water purifier 10 may be provided on the front panel 11. The operation display unit 14 may include one or more buttons and may selectively emit light through the buttons. For example, when a user presses, touches, or otherwise selects a button of the operation display unit 14, light may be emitted at or near the selected button so that a user can easily recognizes that the selected button, and a function associated with the selected button may be performed. In another example, the operation display unit 14 may include a touch screen to display information, such as a graphical user interface, and to detect a touch or other user input related to the displayed information.

In one implementation, the operation display unit 14 may include buttons for selecting the attributes for dispensed water, such as selecting a desired temperature for the dispensed water. For instance, the operation display unit 14 may include buttons for "cold" water (e.g., water cooled below a first prescribed temperature), "hot" water (e.g., water heated above a second prescribed temperature), or room-temperature water (e.g., water that is neither heated nor cooled). Furthermore, the operation display unit 14 may include a button indicating whether a hot water mode has been turned on or off, and the operation display unit 14 may display temperatures of the hot water and/or the cold water. In another example, the operation display unit 14 may include buttons for displaying certain quantities of the purified water to be dispensed, such as a first button for dispensing a first quantity of purified water and a second button for continuously dispensing purified water. It should be appreciated that the operation display unit 14 may exclude some of these buttons and/or may include other buttons for performing other functions, such as buttons to provide ice, a flavoring, or another liquid.

The water purifier 10 may further include a water chute 15 under the operation display unit 14. The water chute 15 is operated by a user to cause the purified water to be dispensed. The water chute 15 opens/closes to selectively dispense purified water to the user, and water chute 15 may also be referred to as an opening/closing part or an opening/closing nozzle. For example, the operation of the water chute 15 may be controlled by one or more buttons in the operation display unit 14 to dispense purified room-temperature water, cold water, or hot water.

A tray for collecting water dripping from the water chute 15 may be provided at the lower end of the front panel 11. The tray may be formed with a shape defining an internal space or cavity to receive dripping water and may have a grill-shaped cover on the top for filtering foreign substances. The tray may be moved with respect to the front panel 11 or removed altogether to allow a user to receive purified water in water bottles or other containers having heights that exceed a predetermined distance between the water chute 15 and the tray or in containers having wide bottoms. In one example, the tray may include a float or other visual indicator showing a level of waste water collected within the tray, so a user can recognize when to empty the tray.

Although not shown in the figures, several components of a cooling cycle are provided inside the panels forming the external shape of the water purifier 10. In detail, the water purifier 10 may include one or more of a compressor that compresses a refrigerant into a high-temperature and high-pressure gaseous refrigerant, a condenser that condenses the refrigerant from the compressor into a high-temperature and high-pressure liquid refrigerant, and a condenser fan for heat exchange with the condenser. The water purifier 10 may further include an expansion valve that expands the refrigerant from the condenser into a low-temperature and low-pressure 2-phase refrigerant, and an evaporator (to be described below) to which the low-temperature and low-pressure 2-phase refrigerant flows after passing through the expansion valve.

The water purifier 10 may also include a cold water production unit, and as described below, the cold water production unit may include the evaporator and a cold water pipe or coil through which purified water flows. The water purifier 10 may further include a heater for heating supplied water to a set temperature. The water purifier 10 may further include a filter assembly that filters foreign substances from or chemically treats water received from an external water supplier. The filter assembly may include, for example, one or more of a fine physical barrier or a chemical process (e.g., a carbon module) filter.

Figure 2:
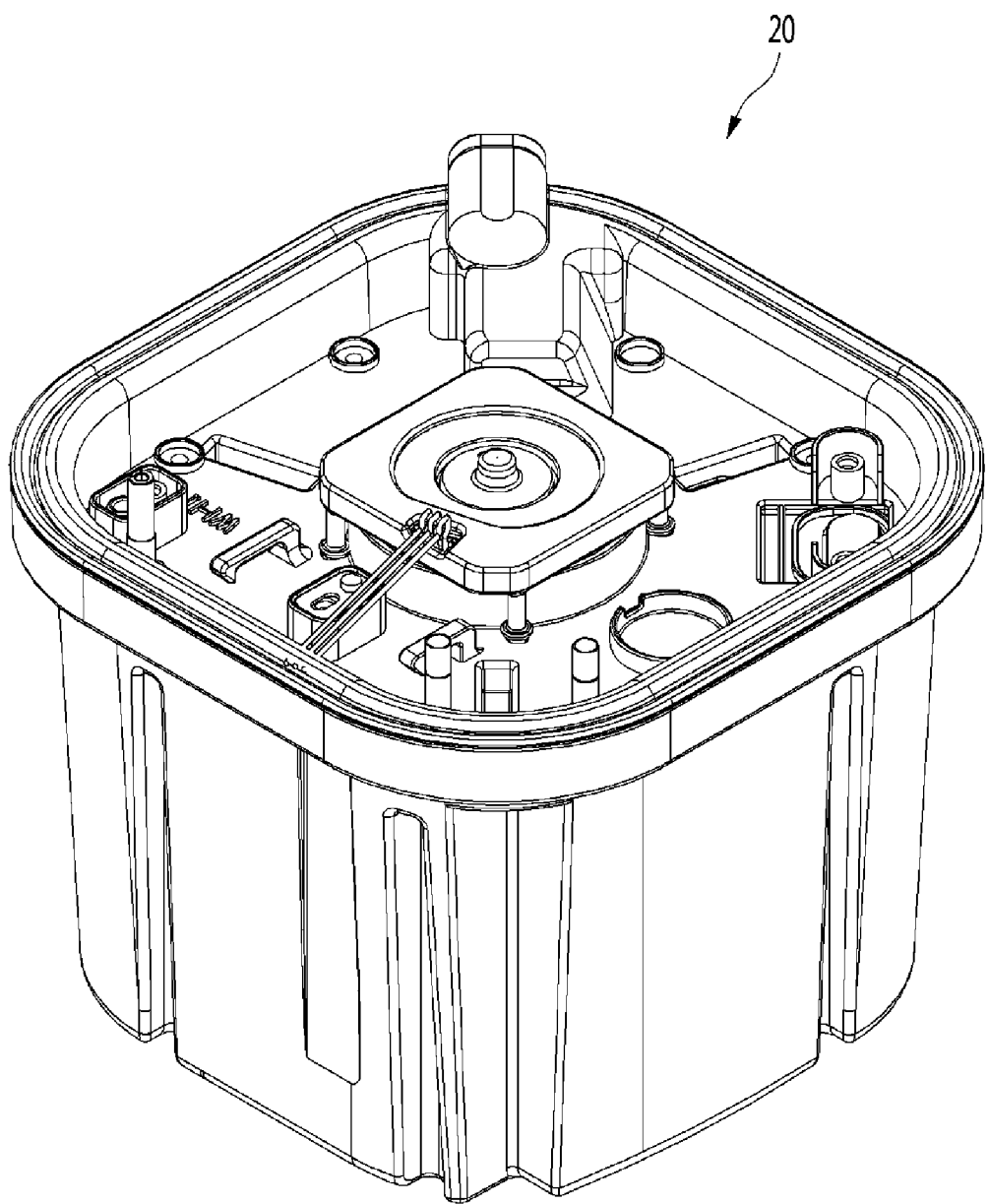
FIG. 2 is a perspective view of a cold water production unit of the water purifier according to the embodiment of the present disclosure.
Figure 3:
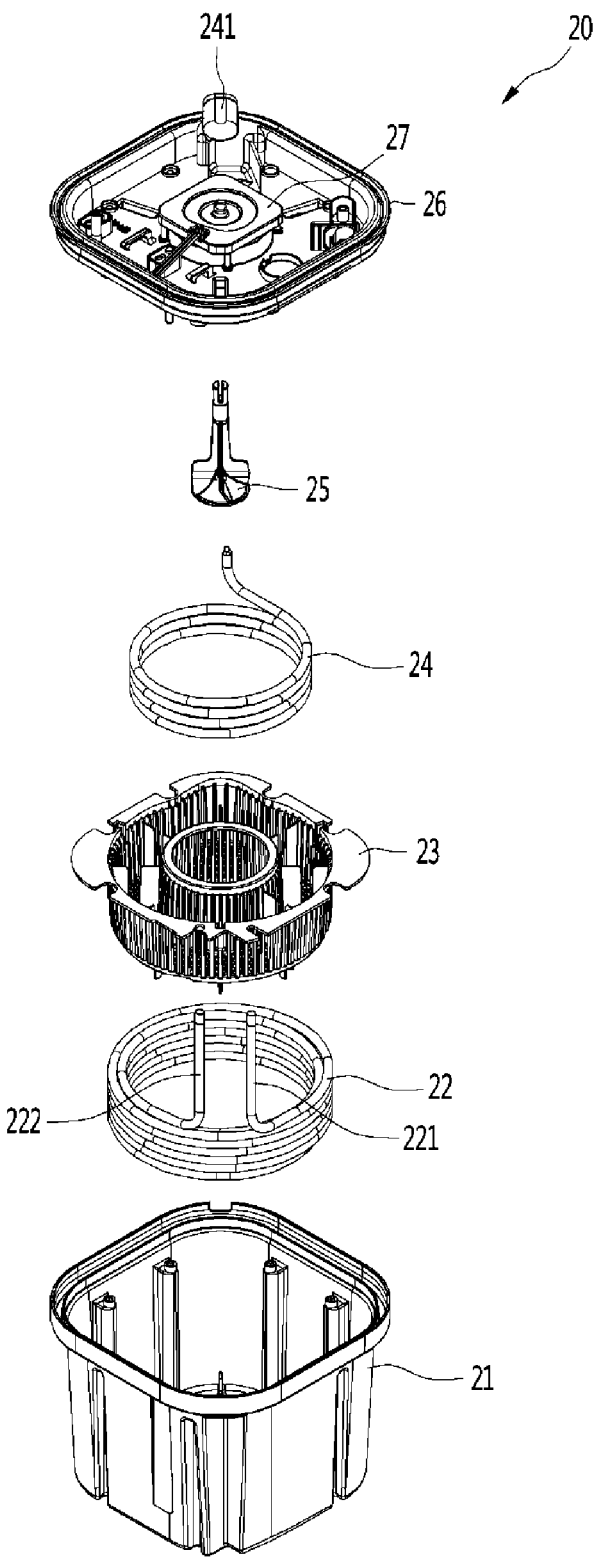
FIG. 3 is an exploded perspective view of the cold water production unit.
Figure 4:
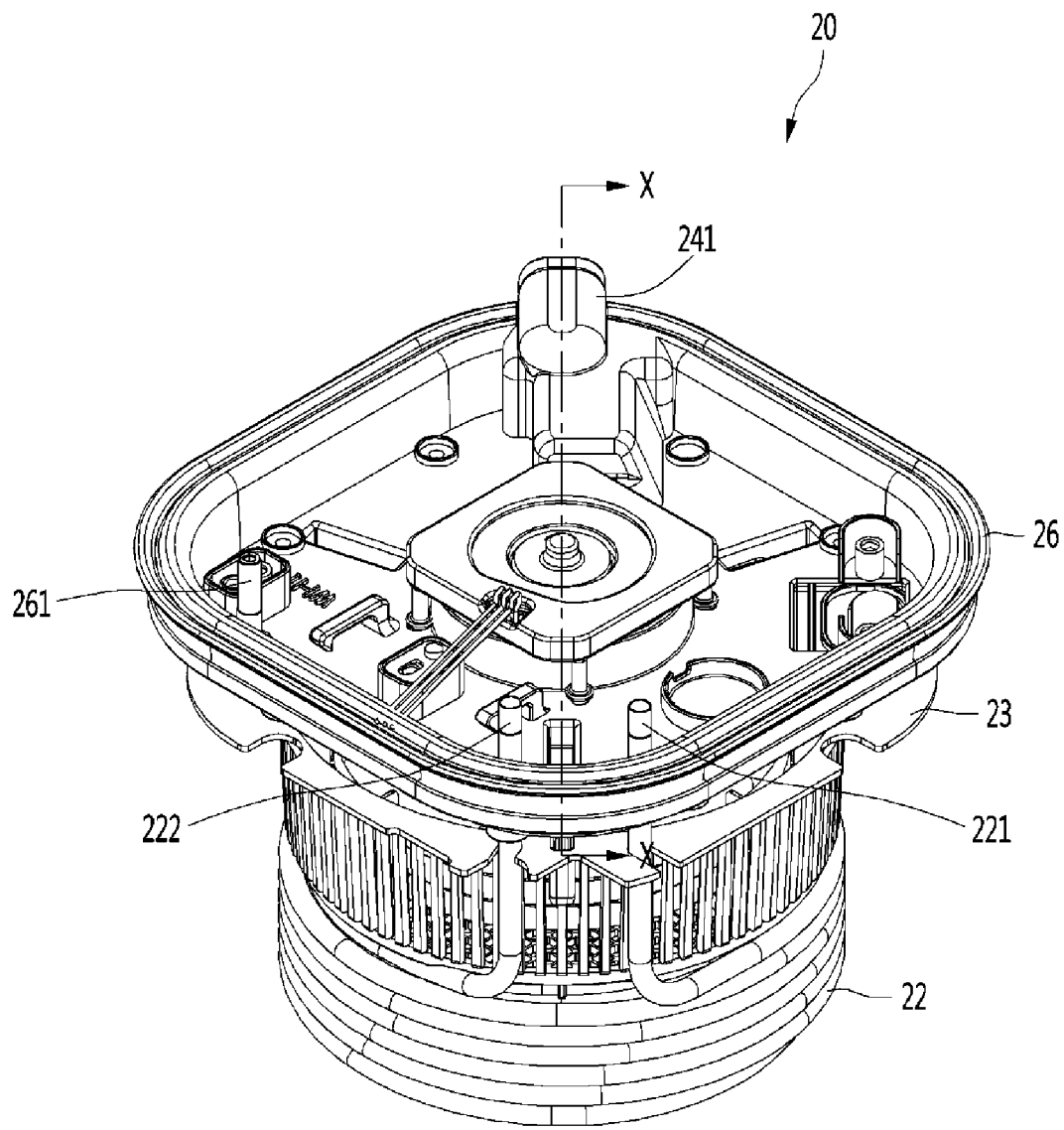
FIG. 4 is a perspective view of the assembly of the cold water production unit with a cooling water tank removed.

FIG. 2 is a perspective view of a cold water production unit of the water purifier according to the first embodiment of the present disclosure, FIG. 3 is an exploded perspective view of the cold water production unit, and FIG. 4 is a perspective view of the assembly of the cold water production unit with a cooling water tank removed. Referring to FIGS. 2 to 4, a cold water production unit (also referred to as a liquid cooler or water cooler) 20 according to an embodiment of the present disclosure may include: a cooling water tank 21 that holds cooling water or other liquid; an insulating case (not shown) to insulate the cooling water tank 21 from the interior air; a drain valve (not shown) that is connected to the internal space of the cooling water tank 21 through the insulating case; a cold water pipe (or cold water coil) 22 that is provided in the cooling water tank 21; a separator 23 that is provided over the cold water pipe 22 in the cooling water tank 21; an evaporator (or evaporator coil) 24 that is provided inside the water tank 21 and above the separator 23; a stirring motor support 26 that is provided at a top of the cooling water tank 21 and functions as a cover for sealing the cooling water tank 21; a stirring motor 27 that is fixed to the stirring motor support 26 and has a rotary shaft extending downward; a stirring member (or stirrer) 25 that is provided in the cooling water tank 21 and is connected to the rotary shaft of the stirring motor 27; and a tank cover (not shown) that covers an open top of the cooling water tank 21.

In one implementation, the drain valve may be provided through the insulating case and the cooling water tank 21 and may be inserted through a side of the insulating case corresponding to a portion adjacent to the bottom of the cooling water tank 21. When the drain valve is opened, the water or other liquid held in the cooling water tank 21 can be discharged out of the water purifier 10.

The cold water pipe 22 may be a coil that is spirally wound into a cylinder or other shape. In the cold water pipe 22, vertically adjacent portions may be in contact each other or may be spaced apart at a predetermined distance from each other. Similarly, horizontally adjacent portions of the cold water pipe 22 may contact each other or may be spaced apart at a predetermined distance from each other.

The cold water pipe 22 may be, as shown in the figures, wound several times horizontally with respect to the cooling water tank 21 to extend in a spiral or helical direction such that the cold water pipe 22 includes two or more concentric layers of piping. The cold water pipe 22 may be doubly wound in one embodiment to form two vertical layers. In detail, the cold water pipe 22 may be spirally doubly wound into a substantially cylindrical shape such that the vertical side portions include two concentric layers of piping. Although examples in which the cold water pipe 22 is double wound into two concentric layers are discussed herein, it should be appreciated that the cold water pipe 22 may be spirally wound into three or more layers and positioned within the water tank 21.

When the cold water pipe 22 is wound several times to form a coil with multiple concentric layers of piping, the heat exchange area between the purified water flowing through the cold water pipe 22 and the cooling water in the tank 21 can be relatively increased since a greater length of the cold water pipe 22 is positioned within the cooling water. For example, providing a greater length of the cold water pipe 22 within the cooling water results in a greater surface area of contact between the cold water pipe 22 and the cooling water. Furthermore, since the cold water pipe 22 is wound several times, the entire height of the cold water pipe 22 can be decreased in comparison to a single wound pipe of similar length. For example, if the cold water pipe 22 is double wound, the entire height of the cold water pipe 22 can be decreased by half in comparison to a single wound pipe of similar length. Accordingly, a sufficient heat exchange area may be provided between the cold water pipe 22 and the cooling water in the cooling water tank 21, while a height of the cold water pipe 22 and an associated height for the cooling water tank 21 holding the cold water pipe 22 may be decreased.

The cold water pipe 22 may be constructed from stainless steel, brass, another metal, or other material of high thermal conductivity and may be formed by winding a hollow cylinder pipe into the double wound coil shape shown in the figures. Since the cold water pipe 22 may be constructed from a material and shape associated with relatively high elasticity or rigidity, such as stainless steel piping, a 'spring-back' of the cold water pipe 22 may occur due to the doubly wound shape. In spring-back, the high-rigidity object tends to return to an original shape (e.g., a straight pipe) due to a returning elastic force associated with the material and shape. In order to prevent the spring-back, one embodiment includes a holder on the bottom of the cooling water tank 21 (see FIG. 8) for holding the cold water pipe 22 in the double wound cylinder shape, and aspects of the holder will be described in detail below.

In the cold water pipe 22, an inlet end 221 may be connected to a channel to the water supplier, and an outlet end 222 may be connected to a channel to the water chute 15 to output the chilled purified water. Since the cold water pipe 22 is doubly wound, both the inlet end 221 and the outlet end 222 bend to extend in a common direction from the cold water pipe 22. For example, the inlet end 221 and the outlet end 222 of the cold water pipe 22 may vertically extend upward toward the stirring motor support 26. If the cold water pipe 22 is spirally wound an odd-number of times (e.g., three times, five times, etc.) to form an odd number of layers, the inlet end 221 and the outlet end 222 would be positioned at opposite vertical edges of the cold water pipe 22. In this configuration, it may be complicated or difficult to support the cold water pipe 22 within the cold water production unit 20. Accordingly, winding the cold water pipe 22 even-numbered times (e.g., doubly, four times, etc.) may decrease the complexity and costs of the cold water production unit 20.

The separator 23 may be provided over the cold water pipe 22 and may divide the internal space of the cooling water tank 21 into a first space in which the evaporator 24 is provided and a second space in which the cold water pipe 22 is provided. The separator 23 is perforated to include openings or holes that allow a circulation of the cooling water between the evaporator 24 and the cold water pipe 22. Accordingly, ice that is formed around the evaporator 24 in the first space and is larger than the perforations of the separator 23 cannot move to the second space and block a flow of the cooling water around the cold water pipe 22.

The evaporator 24 may be positioned in the first space defined by the separator 23 (e.g., above the separator 23 in the figures). The evaporator 24 is connected to the outlet end of the expansion valve that is connected to the outlet end of the condenser. A refrigerant that flows through a refrigerant pipe forming the evaporator 24 cools the cooling water in the cooling water tank 21 by exchanging heat with the cooling water. The cooling water cools purified water flowing through the cold water pipe 22 by a second heat exchange.

The stirring motor support 26 may be provided over the separator 23. The stirring motor support 26 is coupled to the top of the cooling water tank 21, where it can cover the top of the first space receiving the evaporator 24. That is, the first space may be defined between the stirring motor support 26 and the separator 23, while the second space may be defined between the separator 23 and a bottom of the cooling water tank 21.

A cold water intake port 261 may be formed at a side of the stirring motor support 26. The cold water intake port 261 is connected to a channel to the water supplier or to channel carrying purified water from the filter assembly so that the cooling water tank 21 can be supplied with the cooling water. An evaporator connector 241 may be formed at another portion or side of the stirring motor support 26. The evaporator connector 241 may be connected to the inlet end of the evaporator 24 to provide the refrigerant to the evaporator 24.

The stirring member 25 may be positioned in a substantially middle portion of the second space, but is not limited thereto. When the stirring member 25 is rotated (e.g., by the stirring motor 27), the cooling water is freely moved and mixed between the first space and the second space within the cooling water tank 21 through the separator 23. Accordingly, the temperature of the cooling water cooled by the evaporator 24 may be more uniformly maintained throughout the inside of the cooling water tank 21. The stirring member 25 may be formed in a blade shape or an impeller shape radially extending from the rotary shaft, as shown in the figures, but is not limited thereto and may be formed in various other shapes. The structure for mounting the stirrer 25 will be described in detail below.

Figure 5:
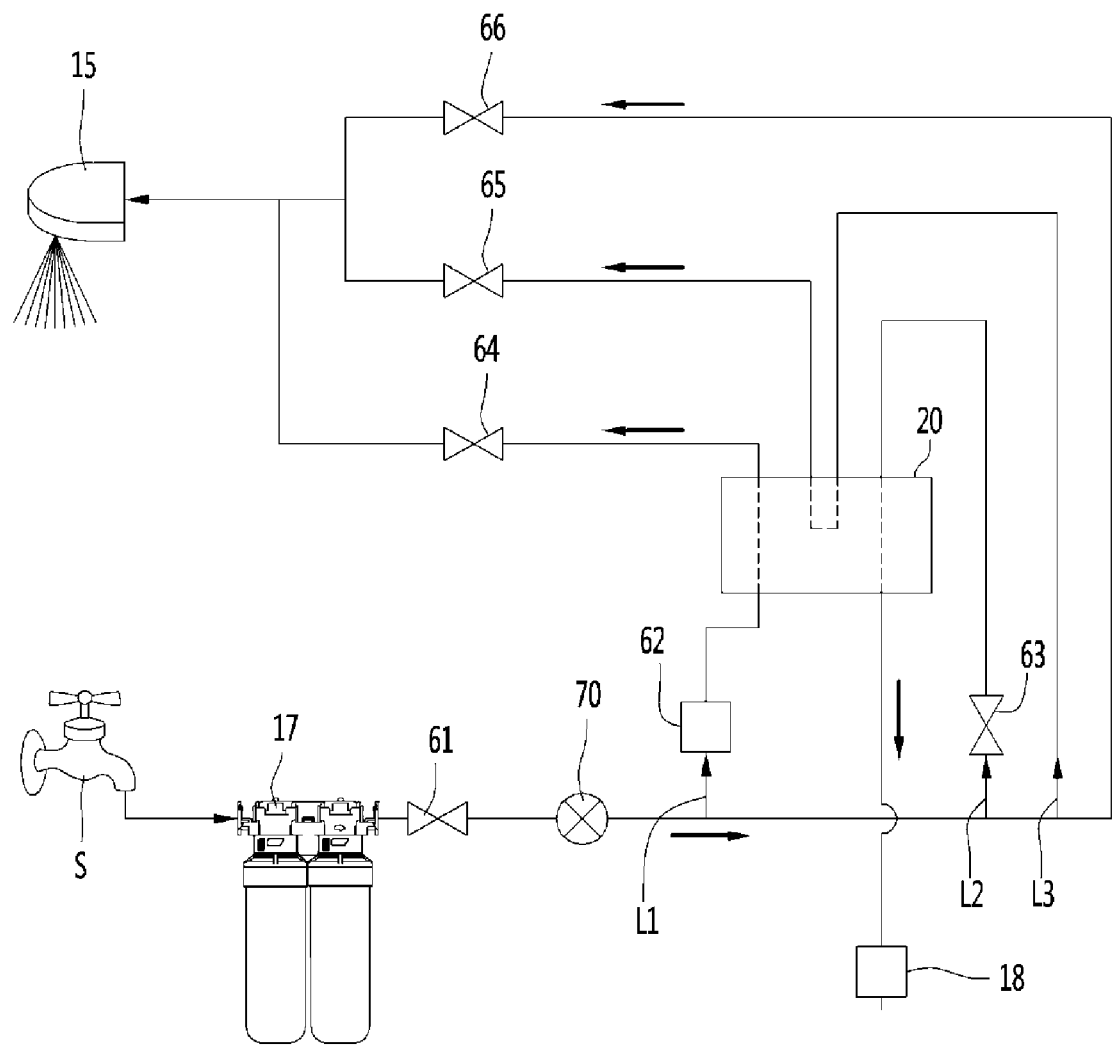
FIG. 5 is a system diagram showing a water channel connected to the water purifier according to the first embodiment of the present disclosure.

FIG. 5 is a system diagram showing a water channel associated with the water purifier 10 according to an embodiment of the present disclosure. Referring to FIG. 5, a water supply line L is formed from a water supplier S to the water chute 15 of the water purifier 10, and various valves and components for purifying water may be connected to the water supply line L. In detail, the water supply line L is connected to the water supplier S, such as a faucet in a house, and a filter assembly 17 is provided at a predetermined portion of the water supply line L so that the filter assembly 17 can filter or remove foreign substances to purify the water supplied from the water supplier S.

A water supply valve 61 and a flow sensor 70 may be sequentially provided on the water supply line L connected to the outlet end of the filter assembly 17. Accordingly, when the amount of water sensed by the flow sensor 70 reaches a desired flow rate, the water supply valve 61 can be controlled to maintain this flow rate. A hot water line L1, a cooling water line L2, and a cold water line L3 may diverge from a predetermined portion of the water supply line L extending from the outlet end of the flow sensor 70.

A purified (i.e., room temperature) water valve 66 may be provided at the end of the water supply line L extending from the outlet end of the flow sensor 70, and a hot water valve 64 may be provided at the end of the hot water line L1. A cold water valve 65 may be provided at the end of the cold water line L3, and a cooling water valve 63 may be provided at a predetermined portion of the cooling water line L2. In detail, the cooling water valve 63 is provided at a predetermined portion of the water supply line L that connects the cooling water intake port 261 and the diverging point of the cooling water line L2, so cooling water valve 63 can control the amount of cooling water that is supplied to the cooling water tank 21.

The water supply lines extending from the outlet ends of the hot water valve 64, the cold water valve 65, and the purified water valve 66 may all be connected to the water chute 15. Further, as shown in the figures, the purified (i.e., room temperature) water, the cold water, and the hot water may be connected to a single output or may be connected to respective different outputs.

The drain valve 18 may be provided on a water supply line extending out of the cold water production unit 20, as shown in FIG. 5. In another example, the drain valve 18 may be inserted through the cooling water tank 21, as described above.

A flow control valve 62 may be provided at a predetermined position of the hot water line L1 (e.g., after the flow sensor 70), and a heater (not shown) may be connected to the hot water line L1 extending from an outlet end of the flow control valve 62. A hot water valve 64 may be provided in a portion of the water supply line L that extends from an outlet end of the heater. For example, water may be heated to a predetermined temperature in the heater after flowing through the hot water line L1, and when a hot water button of the operation display unit 14 is selected (or other input is received), the hot water valve 64 is opened to dispense hot water through the water chute 15.

Figure 6:
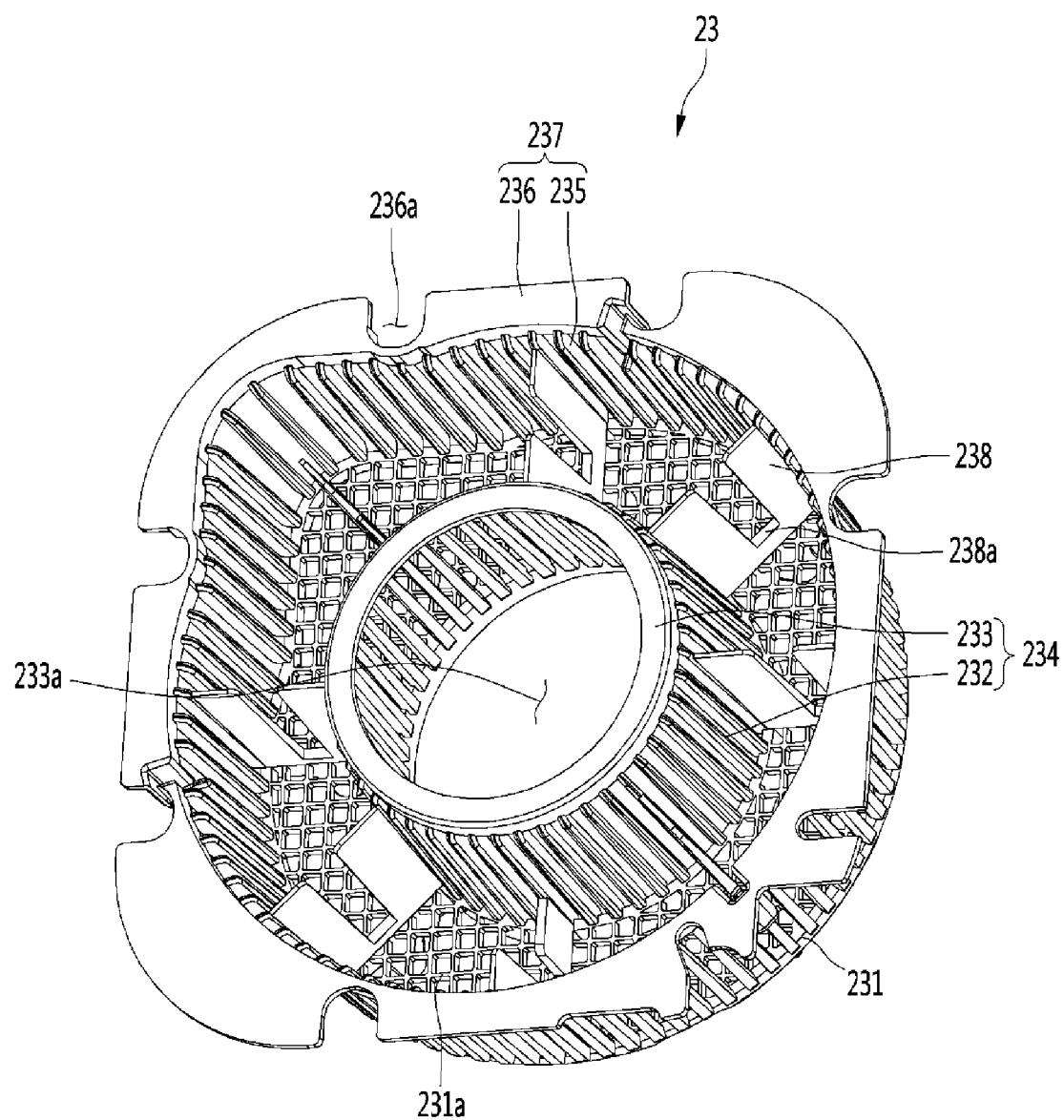
FIG. 6 is a top perspective view of a separator that is combined with the cold water production unit of the water purifier according to the first embodiment of the present disclosure.
Figure 7:
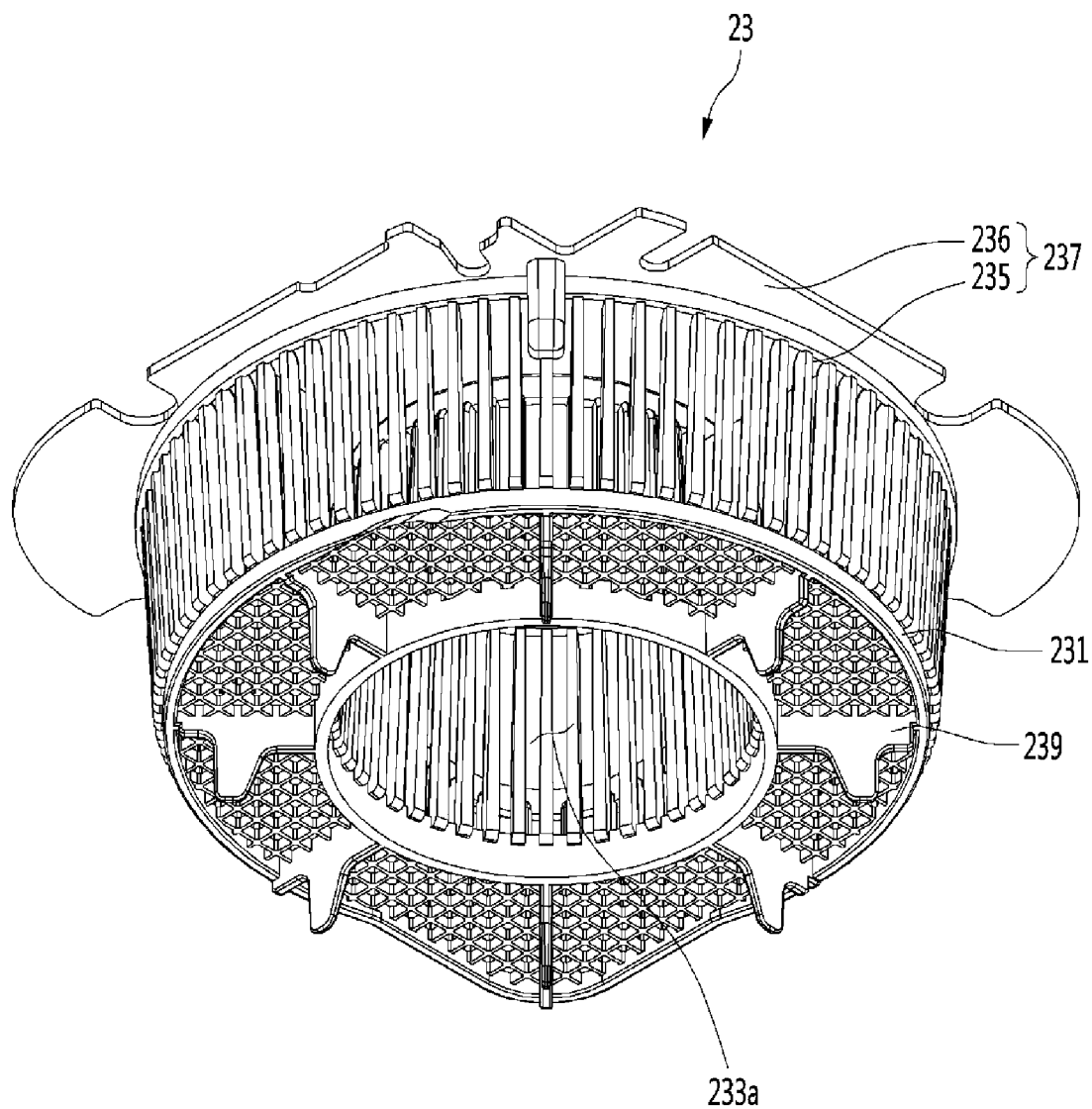
FIG. 7 is a bottom perspective view of the separator.

The separator 23 according to the present disclosure is described hereafter in detail with reference to the drawings. FIG. 6 is a top perspective view of the separator 23 that is combined with the cold water production unit of the water purifier according to an embodiment of the present disclosure, and FIG. 7 is a bottom perspective view of the separator 23. Referring to FIGS. 6 and 7, the separator 23 may be molded plastic. In particular, the separator 23 may be made of soft bendable plastic, such as a polyethylene. The separator 23 is provided inside the cooling water tank 21 and may have a shape such that the separator 23 divides the internal space of the cooling water tank 21 into the first space within (or above) the separator 23 and the second space outside (or below) the separator 23. A portion (e.g., a top rib 236) may be fixed to an inner surface of the cooling water tank 21 or may be held in a desired positioned through contact with the cold water pipe 22 and/or the evaporator 24.

In detail, the separator 23 may have a bottom (or bottom layer) 231 horizontally placed in the cooling water tank 21, a first extension 234 extending upward from a portion of the bottom 231, and a plurality of separation walls 238 extending upward from the bottom 231 to divide the first space into several spaces. The bottom 231 is composed of a plurality of latticed ribs 231a, and holes through which cooling water flows are formed between the latticed ribs 231a. Cooling water within the cooling water tank can freely move between the first space and the second space through the holes the latticed ribs 231a. The bottom 231 may be formed in a shape that is substantially similar to a corresponding transverse plane in the cooling water tank 21. For example, the peripheral size and shape of the bottom 231 may correspond to adjacent interior surfaces of the cooling water tank 21.

A substantially circular center hole may be formed at or near the center of the bottom 231, and the first extension 234 may extends upward from the edge of the center hole. In detail, the first extension 234 may have a plurality of first vertical ribs 232 extending upward from the edge of the center hole and a circular band-shaped first top rib 233 connecting the upper ends of the first vertical ribs 232.

The first vertical ribs 232 may be arranged with substantially regular intervals around the center hole in the bottom 231. The first vertical ribs 232 may include ribs vertically extending from (e.g., orthogonal to) a horizontal surface (e.g., from bottom 231). The first vertical ribs 232 may further include ribs extending at an angle from the horizontal surface or that otherwise extend between two or more of vertically extending ribs. A cylindrical or a truncated conical space may be formed by the first vertical ribs 232 and the first top rib (or ring) 233, and this space may be referred to as a stirring member hole (or stirring member cavity) 233a. That is, the stirring member 25 may be positioned in the second space of the cooling water tank 21 through the stirring member hole 233a. The space formed inside the first extension 234 (that is, the stirring member hole 233a) may also be referred to herein as a "third" space.

The separation walls 238 are formed in planar shapes and may extend laterally from the first vertical ribs 232 and vertically upwards from the bottom 231 to divide the first space into several sub-regions. In detail, the separation walls 238 may be arranged at regular intervals around the center hole. Accordingly, the first space can be divided into several sub-regions defined by the first vertical ribs 232, the separation walls 238, and the inner side of the cooling water tank 21. Therefore, ice that is formed in the first space through a heat exchange between the evaporator 24 and the cooling water in the tank 21 can remain in one of sub-regions inside the first space and is blocked from moving to the other sub-regions inside the first space.

The separation walls 238 may each have a seating groove 238a for holding the evaporator 24. That is, the refrigerant pipe of the evaporator 24 may be spirally wound several times through the seating grooves 238a of the separation walls 238. The width of the seating grooves 238a may be the same as or slightly larger than an outer diameter of the refrigerant pipe of the evaporator 24 so that the evaporator 24 may be received in and supported by the seating grooves 238a.

The separation walls 238 may be integrally formed with the bottom 231. Alternatively, the separation walls 238 may be detachably formed. For example, the separation wall 238 may be detachably fitted in the bottom 231 or may be fitted between the first vertical ribs 232 and the second vertical ribs 235. That is, the separation walls 238 may be selectively attached or detached by a user.

The separator 23 may further have second extensions 237 extending upward from an outside edge of the bottom 231. In detail, the second extension 237 may have a plurality of second vertical ribs 235 extending upward from the edge of the bottom 231 and a second top rib (or top layer) 236 connecting the upper ends of the second vertical ribs 235. The second top rib 236 may be fitted in the cooling water tank 21. That is, the outer edge of the second top rib 236 may be brought in close contact with (e.g., within a threshold distance of) the inner interior surface of the cooling water tank 21.

Coupling grooves 236a may be formed at an lateral outside edge of the second top rib 236, and the coupling grooves 236a may be sized and positioned to fit on coupling projections (not shown) formed on the inner surface of the cooling water tank 21 to couple the separator 23 to the inner surface of the cooling water tank 21. The coupling grooves 236a may be formed in various shapes, quantities, or locations, depending on the shapes, quantities, or locations of the coupling projections.

The second vertical ribs 235 may be spaced around the edge of the bottom 231 and may be coupled to or otherwise extend from an upper surface of the bottom 231. The second vertical ribs 235 are arranged around the separation walls 238, and some of the second vertical ribs 235 may be connected to the ends of the separation walls 238. The separation wall 238 may be positioned between the first vertical ribs 232 and the second vertical ribs 235. Accordingly, the first space can be divided into several spaces by the first vertical ribs 232, the separation walls 238, and the second vertical ribs 235. Therefore, as previously described, ice that is formed near the evaporator 24 in one of the sub-regions of the first space remains in that sub-regions and is blocked by the separation walls 238 from moving to the other sub-regions of the first space. Consequently, ice coming off the evaporator 24 does not contact the walls of the cooling water tank 21, so the ice does not generate noise by impacting the cooling water tank 21 and does not damage the cooling water tank 21.

Cold water pipe seats (or cold water pipe extensions) 239 may be formed in an underside of the bottom 231. The cold water pipe seats 239 may protrude from the underside of the bottom 231 and may be partially stepped. For example, the cold water pipe seats 239 may have stepped sides that are rounded with a curvature corresponding to the outer diameter of a portion of a coiled shape formed by winding the cold water pipe 22. Accordingly, an uppermost portion of the cold water pipe 22 can be seated on the cold water pipe seats 239 (see FIG. 8).

Figure 8:
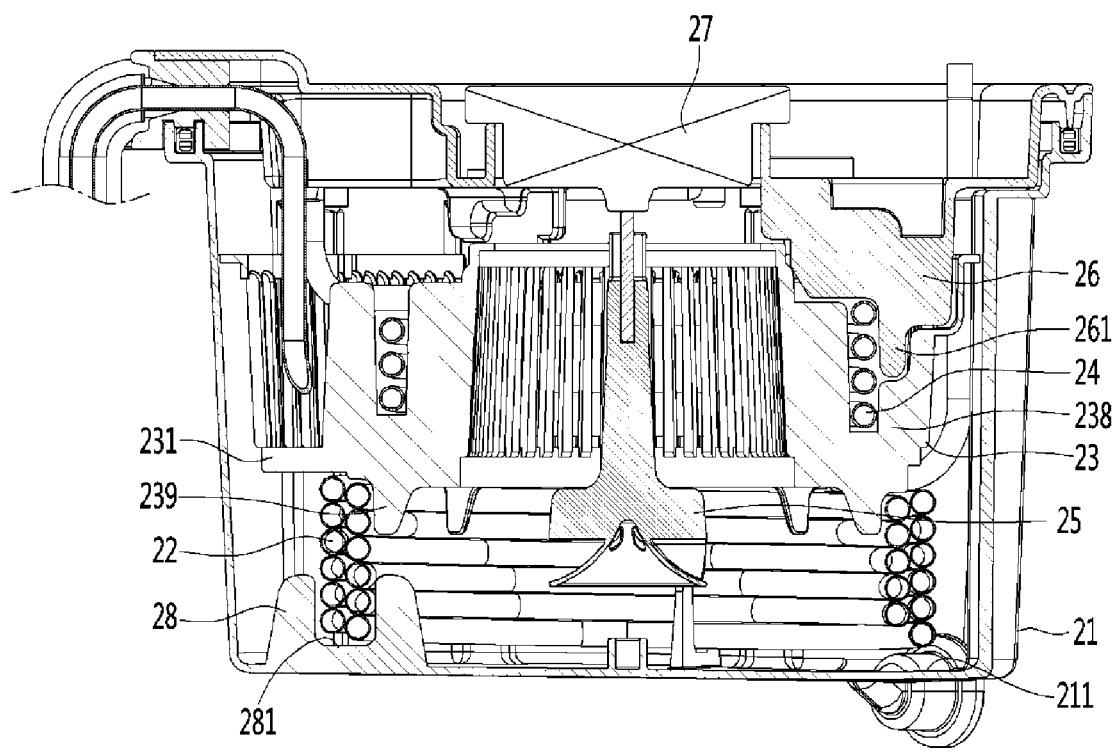
FIG. 8 is a vertical cross-sectional view taken along line X-X of FIG. 4.
Figure 9:
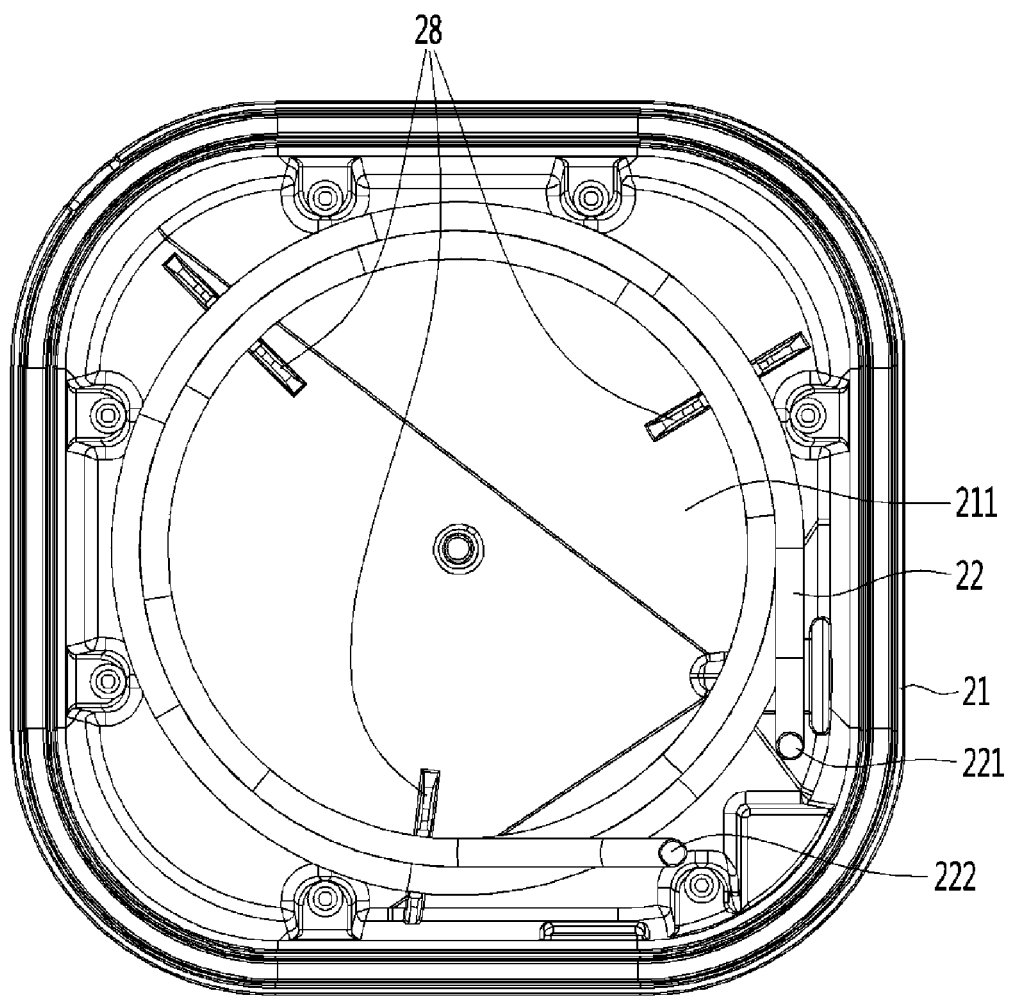
FIG. 9 is a plan view of a cold water pipe that is provided in a cooling water tank.

FIG. 8 is a vertical cross-sectional view taken along line X-X of FIG. 4, and FIG. 9 is a plan view of the cold water pipe 22 that is provided in the cooling water tank 21. Referring to FIGS. 8 and 9, the internal space of the cooling water tank 21 is divided into the first space and the second space by the separator 23 and a third space for receiving the stirring member 25 can be formed in the first space by the first extension 234, as previously described. The first space, with the exception for the third space, can be further divided into several sub-regions by the separation walls 238, as also previously described. In detail, the first space may be formed over the bottom 231 of the separator 23, and the second space may be formed under the bottom 231. The first space is divided into several sub-regions by the first extension 234, the separation walls 238, and the second extension 237.

The cold water pipe 22 is positioned above a bottom surface of the cooling water tank 21, and the separator 23 is positioned over the cold water pipe 22 in the cooling water tank 21. The outer edge of the second top rib 236, formed on the top portion of the separator 23, is in close contact with an inner surface of the cooling water tank 21 to position and fix the separator 23 in the cooling water tank 21. The cold water pipe seats 239 may be formed on the underside of the bottom 231 and may extend downward to contact and hold a portion of the cold water pipe 22 in a desired positioned.

The refrigerant pipe of the evaporator 24 may be spirally wound inside the separator 23 to form a substantially round coiled shape. The coiled refrigerant pipe 24 may be supported in the seating grooves 238a of the separation walls 238 to position the evaporator 24 in the first space.

When the stirring member 25 is rotated (e.g., by the storing motor 27), the cooling water is circulated in the cooling water tank 21, such as to flow between the first space and the second space. This motion of the cooling water helps to maintain more uniform internal temperatures within the cooling water tank 21. Otherwise, water cooled by contact with the evaporator 24 may remain in the first space, and water warmed by contact with the cold water pipe 22 may remain in the second space, limiting the ability of cold water production unit 20 to cool the purified water passing through the cold water pipe 22.

Furthermore, the movement of the cooling water caused by the stirring motion of the stirring member 25 helps to melt ice generated in the first space by circulating relatively warmer water toward the ice. As previously described, the ice formed in the first space by contact with the evaporator 24 may be isolated in the first space by the separator 23 so that the ice cannot be move to the second space while the cooling water can circulate between the first and second spaces. Furthermore, since the first space is divided into several sub-regions by the separation walls 238 of the separator 23, ice formed in one of the sub-regions does not move to the other sub-regions. Thus, the ice made in the sub-regions cannot freely move within the first space to other sub-regions since the movement of the ice is limited by the separation walls 238. Consequently, the separation walls 238 may prevent a movement or a rotation of ice within the first space or region due to a clockwise or a counterclockwise flow of water that is formed by the stirring motion of the stirring member 25. Accordingly, the motion of the stirring member 25 does not cause the ice to move and contact the stirring member 25, the cold water pipe 22, the evaporator 24, or the interior surface of the cooling water tank 21, preventing the ice from damaging to these components and reducing noises caused by the ice impacting these components.

A holder (or holder rib) 28 for fixing the cold water pipe 22 within the second space may be formed inside the cooling water tank 21. For example, the holder 28 may protrude a predetermined height upward from the bottom (or bottom surface) 211 of the cooling water tank 21. In detail, the holder 28 may have a rib shape to receive and seat the spirally wound cold water pipe 22. The holder 28 may include a seating groove 281 for receiving the cold water pipe 22, and the seating groove 281 may be formed at the top of the holder 281 in a substantially U-shape. The multiple wound cold water pipe 22 can be partially inserted in the seating groove 281 such that two or more layers of the cold water pipe 22 are positioned in close contact with surfaces of the holder 28. For example, an interior piping layer of the cold water pipe 22 may contact an interior vertical surface of the holder 28, and an exterior piping layer of the cold water pipe 22 may contact an exterior vertical surface of the holder 28. Accordingly, the holder 28 fixes and support the cold water pipe 22 to deter a bending of the cold water pipe 22 from spring-back and can prevent noise caused by a movement of the cold water pipe 22 within the cooling water tank 21.

A plurality of holders 28 may be formed on the bottom 211 of the cooling water tank 21. For example, three holders 28 may be formed on the bottom of the cooling water tank 21 and may be arranged at a predetermined distance circumferentially along the cold water pipe 22. For example, the three holders 28 may be arranged with regular intervals such that an angle distance between two adjacent ones of the holders 28 is about 120°. The holders 28 simultaneously hold the cold water pipe 22, so the cold water pipe 22 can be firmly fixed without moving or shaking within the cooling water tank 21. However, it should be appreciated that the number of the holders 28 is not limited to three, and the cold water production unit 20 may include fewer or more holders 28. Furthermore, it should be appreciated that the holders 28 may be spaced apart at different, non-uniform intervals as appropriate to fix the position of the cold water pipe 22 while providing sufficient space in the cold water production unit 20 for other components. For instance, the holders 28 may be positioned away from the drain valve 18.

The structure for fixing the cold water pipe 22 with the components of the cold water production unit 20 is described hereafter with reference to FIG. 8. For example, the cold water pipe 22 may contact and, therefore, be fixed in a given location in the cold water production unit 20 by the cooling water tank 21, the separator 23, and the stirring motor support 26. In detail, the holders 28 on the bottom 211 of the cooling water tank 21 may contact a lower portion of the cold water pipe 22 such that the lower portion of the cold water pipe 22 contacts the interior surfaces of the seating grooves 281 of the holders 28. Accordingly, when the cold water pipe 22 is double wound to include two layers of piping, a first layer of the cold water pipe 22 may be supported by one surface of the seating grooves 281, and a second layer of the cold water pipe 22 may be supported by a second surface of the seating grooves such that the two layers of the cold water pipe 22 are held in close contact with each other and cannot separate.

The cold water pipe seats 239 are formed to extend downward from the bottom of the separator 23 to be in close contact with a top portion of the cold water pipe 22. More specifically, the top interior portion of the cold water pipe 22 can contact a lateral exterior surface of the cold water pipe seats 239. Thus, the cold water pipe seats 239 may contact the innermost layer of the cold water pipe 22. For example, the cold water pipe seats 239 and the innermost layer of the cold water pipe 22 may be designed to be forcibly fitted against each other, such as configuring an interior radius of the cold water pipe 22 to be slightly smaller than a radial distance associated with the cold water pipe seats 239 to cause that interior layer of the cold water pipe 22 to apply a compressive force against lateral exterior surfaces of the cold water pipe seats 239. In this case, the cold water pipe seats 239 apply outward pressure to push a portion of the cold water pipe 22 away from a center so the cold water pipe 22 can be firmly supported. Furthermore, since the cold water pipe 22 is fitted between the holders 28 and the cold water pipe seats 239, a spring-back due to double (or more) winding of the cold water pipe 22 can be prevented.

The bottom of the stirring motor support 26, on which the stirring motor 27 is provided, may be positioned in close contact with a top of the separator 23. Consequently, the bottom of the stirring motor support 26 may provide a downward pressing force against the separator 23, and the separator 23 may transfer this downward pressing force against the cold water pipe 22 to fix the cold water pipe 22 more firmly against the holders 28 and the bottom 211 of the cooling water tank 21.

Figure 10:
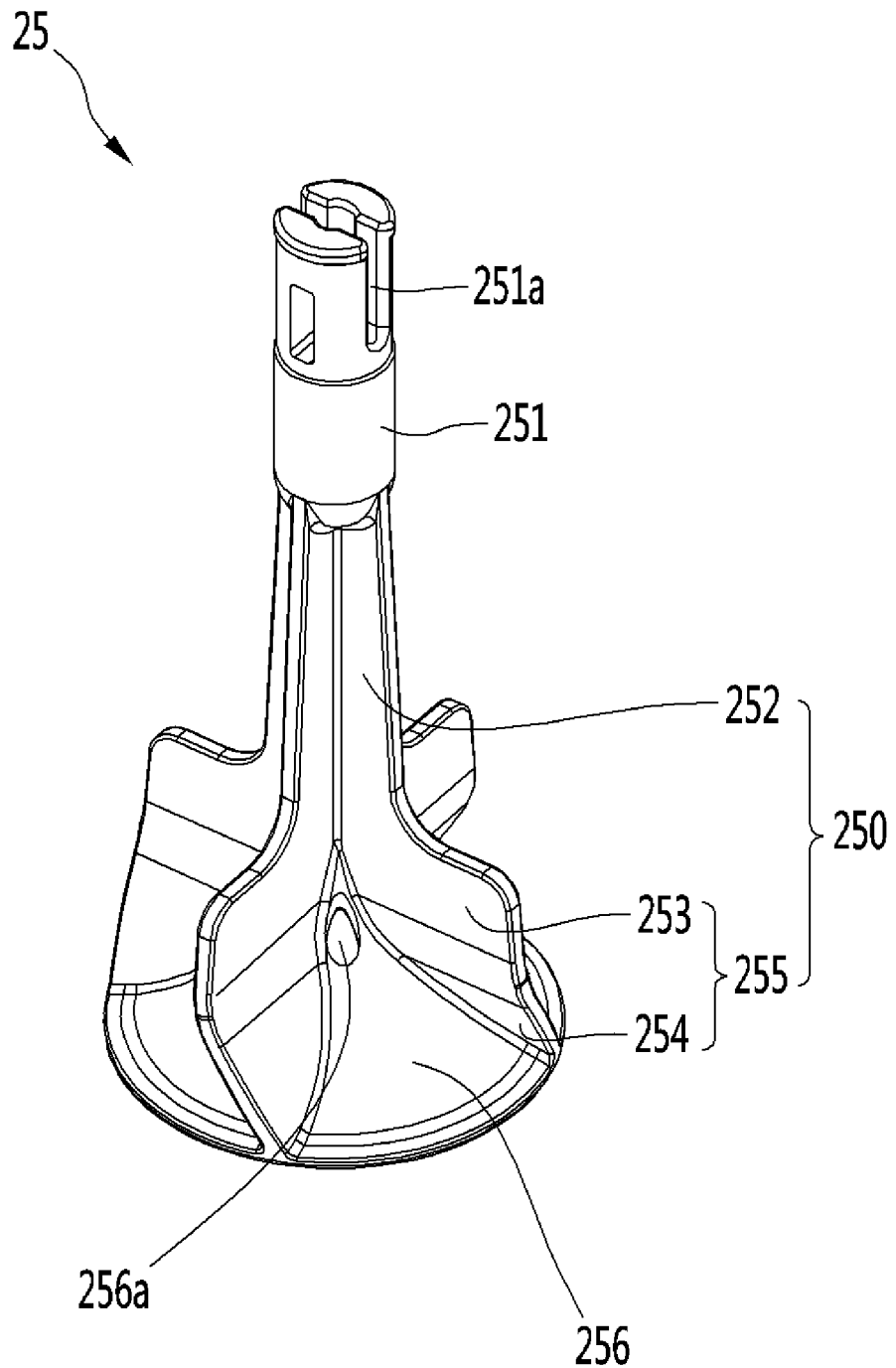
FIG. 10 is a top perspective view of a stirrer according to a first embodiment of the present disclosure.
Figure 11:
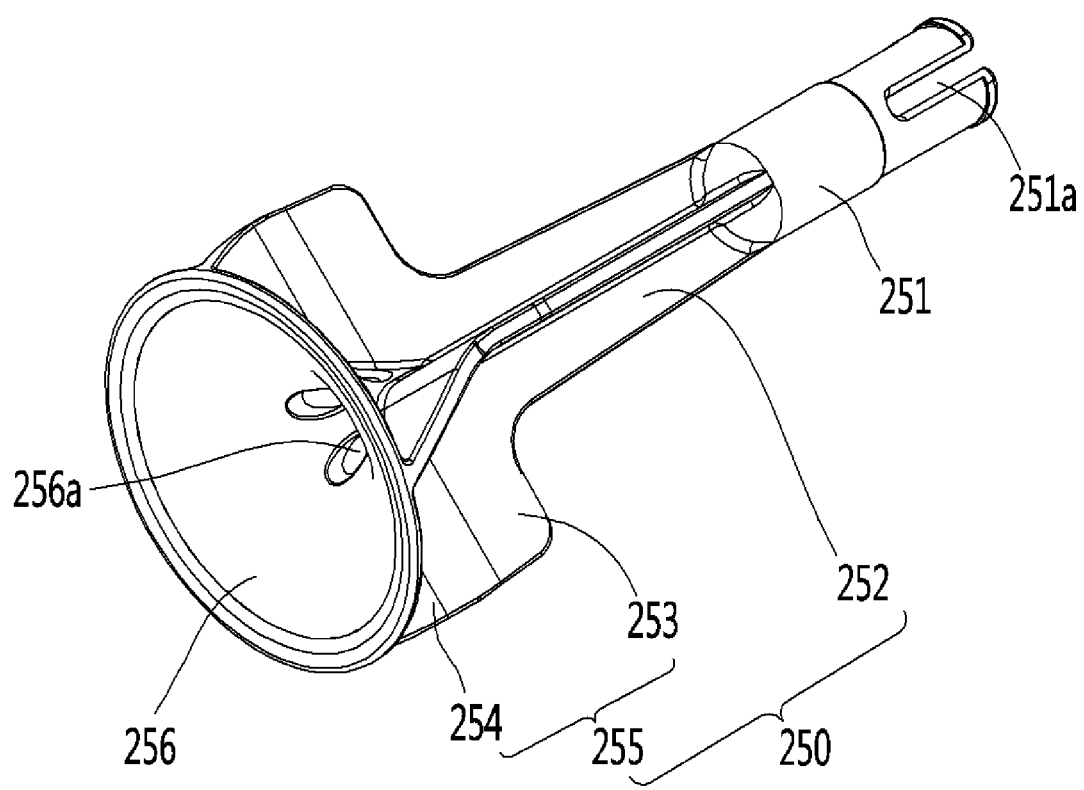
FIG. 11 is a bottom perspective view of the stirrer.
Figure 12:
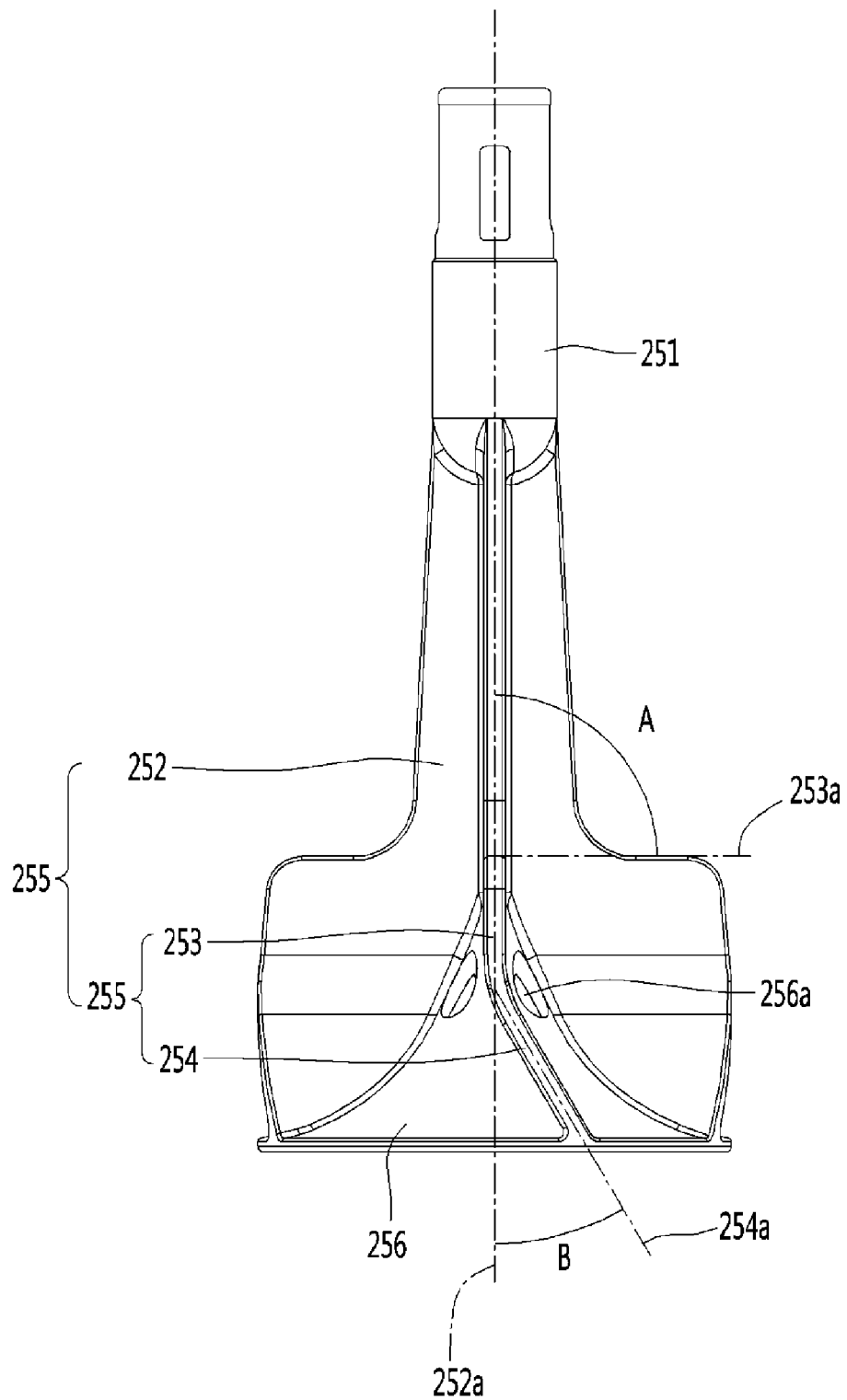
FIG. 12 is a front view of the stirrer.

A structure of the stirring member (or stirrer) 25 according to the first embodiment of the present disclosure is described hereafter in detail with reference to FIGS. 10 to 12. FIG. 10 is a top perspective view of a stirrer 25 according to the first embodiment of the present disclosure, FIG. 11 is a bottom perspective view of the stirrer 25, and FIG. 12 is a front view of the stirrer 25. Referring to FIGS. 10 to 12, the stirrer 25 according to the first embodiment of the present disclosure includes a stirring shaft (or shaft) 251 coupled at one end to the rotary shaft of the stirring motor 27. Another end of the stirring shaft 251 includes a plurality of mixing wings (or vanes or mixing vanes) 250 spaced at a predetermined from each other around the stirring shaft 251, and a conical (or horn-shaped) hub 256 connecting the mixing wings 250.

In detail, the stirring shaft 251 may be formed in a cylinder or bar shape and may be coupled to the rotary shaft of the stirring motor 27 to rotate with the rotary shaft. A coupling groove 251a for fitting the rotary shaft may be formed at the top of the stirring shaft 251 (i.e., an end proximal to the stirring motor 27) to enable the stirring motor 27 to drive the stirrer 25. The coupling groove 251a may be formed to extend a predetermined depth down from the top of the stirring shaft 251 to provide a space to receive the rotary shaft of the stirring motor 27.

The mixing wings 250 are shaped to generate a water flow when the stirrer 25 is driven by the stirring motor 27. In detail, the mixing wings 250 each have a body (or body extension) 252 extending downward from the lower end of the stirring shaft 251 and a blade 255 extending from the lower end of the body 252 and extending in a substantially radial direction outward from the hub 256.

The bodies 252 extend a predetermined length downward from the lower end of the stirring shaft 251 such that the blades 255 are positioned at a lower portion in the cooling water tank 21 to contact the cooling water in the cooling water tank 21. For example, the bodies 252 may formed such that the blades 255 are positioned at the center portion of a cavity formed within spiral wound the cold water pipe 22 provided near the bottom of the cooling water tank 21. Accordingly, when the stirrer 25 is rotated, heat may be efficiently exchanged between cooling water and the cold water flowing through the cold water pipe 22 due to a water flow that is generated by a stirring motion by the blades 255.

The blades 255 extend in a substantially radial direction from the hub 256, beginning at the lower ends of the bodies 252. Each of the blades 255 may have an extension (or blade extension) 253 positioned in the same vertical plane as the body 252 and a bending portion (or bending extension) 254 extending radially outward from the hub 256 and also in the circumferential direction of the hub 256 from the lower end of the extension 253. The lower end of the bending portion 254 may extend between an outer, lower edge of the hub 256 and a central, top portion of the hub 256.

When the stirrer 25 is rotated, the extension 253 of the blade 255 generates a radial water flow toward the sides of the cooling water tank 21. In detail, the extension 253 radially extends outward from the lower end of the body 252. The angle A between a line 253a extending from the top edge of the extension 253 and a vertical line 252a passing through the center of the stirring shaft 251 may be 90°. However, the present disclosure is not limited thereto, and the angle A between the line 253a extending from the extension 253 and the vertical line 252a passing through the center of the stirring shaft 251 may range, for example, between 70°~110°.

The bending portion 254 initially extends downward from the lower end of the extension 253 and then extends away from vertical line 252a in a circumferential direction of the hub 256. When the stirrer 25 is rotated or otherwise driven by the stirring motor 27, the bending portion 254 forcibly moves water to flow axially and radially toward the sides and the lower ends of the sides of the cooling water tank 21.

In one example, the bending portion 254 is formed to extend or bend from the lower end of the extension 253 in a direction that is opposite to the rotational direction of the stirring motor 27. For example, as shown in FIG. 12, assuming that the stirring motor 27 is rotated clockwise (e.g., to the left), the bending portion 254 may be extend in a counterclockwise (e.g., to the right) circumferential direction, opposite to the rotational direction of the stirring motor 27. The angle B between an inclined plane extending through the bending portion 254 and a vertical plane passing through a top the bending portion 254 at an intersection with extension 253 may be 30°. However, the present disclosure is not limited thereto, and the angle B between bending portion 254 and the vertical plane passing through the top of the bending portion 254 may range, for example, between 20°~40°.

According to this configuration of the present disclosure, when the stirring motor 25 is rotated, a portion of the cooling water around the blades 255 flows to the sides of the cooling water tank 21 along the extensions 253 of the blades 255, and another portion of the cooling water flows to the sides or the lower ends of the sides of the cooling water tank 21 along the bending portions 254 of the blades 255. The cooling water flowing to the sides and the lower ends of the sides of the cooling water tank 21 then flows back up to an upper space of the cooling water tank 21 where pressure is relatively low due to a pressure difference caused by the rotation of the stirrer 25, and then flows back down a central portion of the cooling tank 25 to the blades 255. Accordingly, the rotation of the stirrer 25 causes a circular flow in cooling tank 21 in which that the cooling water is freely moved and mixed between the first space associated with the evaporator 24 and the second space associated with cold water pipe 22 so the temperature of the cooling water remains relatively uniform throughout the inside of the cooling water tank 21.

The hub 256 is formed at the lower ends of the blades 255 to generate a radial water flow toward the cold water pipe 22 when the stirrer 25 is rotated. In one example, the hub 256 may have a substantially conical shape or other shape that corresponds and connect to an interior edge of at least one of the extensions 253 or the bending portions 254 of the blades 255. A lower surface of the hub 256 may define a hollow conical opening at a lower end of the stirrer 25. The outer diameter of the lower end of the hub 256 may correspond to the outer diameter of the lower ends of the blades 255, as shown in FIGS. 10 to 12. The hub 256 secures the lower ends of the blades 255 to prevent the lower ends of the blades 255 from shaking when the stirrer 25 is rotated. Accordingly, when the stirrer 25 is rotated, resonance noise due to a shaking of the blades 255 may be further reduced.

Further, the hub 256 may have a declining surface that extends outwards in a downward direction toward the edge of the hub 256 from the center near vertical line 252a. That is, cooling water flowing downward on the extensions 253 or the bending portions 254 of the blades 255 then radially spreads outward along the inclined surface of the hub 256. Accordingly, at least a portion of the water flow generated by the stirring motion of the blades 255 is directed away from the bottom of the cooling water tank 21, so the cooling water flows smoothly throughout the water tank 21 and does not stagnate near a bottom surface of the water tank 21.

Further, a plurality of air holes (or holes) 256a may be formed through the hub 256. In one example, the air holes 256a each may be formed between adjacent pairs of the mixing wings 250. The air holes 256 may be formed closer to the top center than the lower edge of the hub 256. Alternatively, the hub 256 may have a rounded top and the rounded top may be divided into several sections by at least one of the extensions 253 or the bending portions 254. For example, the rounded top of the hub 256 may be divided into four sections when the stirrer 25 includes four extensions 253 or four bending portions 254 that are equally spaced apart, as shown in the figures, and the air hole 256a may be formed in each of the four sections.

The air holes 256a may discharge the air remaining inside a cavity formed inside the hub 256 to the outside of the hub 256. In detail, when the cooling water tank 21 is filled with the cooling water, a small amount of air may remain inside the hub 256. Then, air bubbles may be produced inside the hub 256 when the stirrer 25 is driven, and noise may be generated by the air bubbles. Accordingly, the air holes 256 may prevent air bubbles from being produced inside the hub 256 and thus, may prevent noise caused by the air bubbles. Although the air holes 256 are formed in each of the four sections of the hub 256 in the figures, the present disclosure is not limited thereto, and the air holes 256a may not be formed in one or more of the sections.

Figure 13:
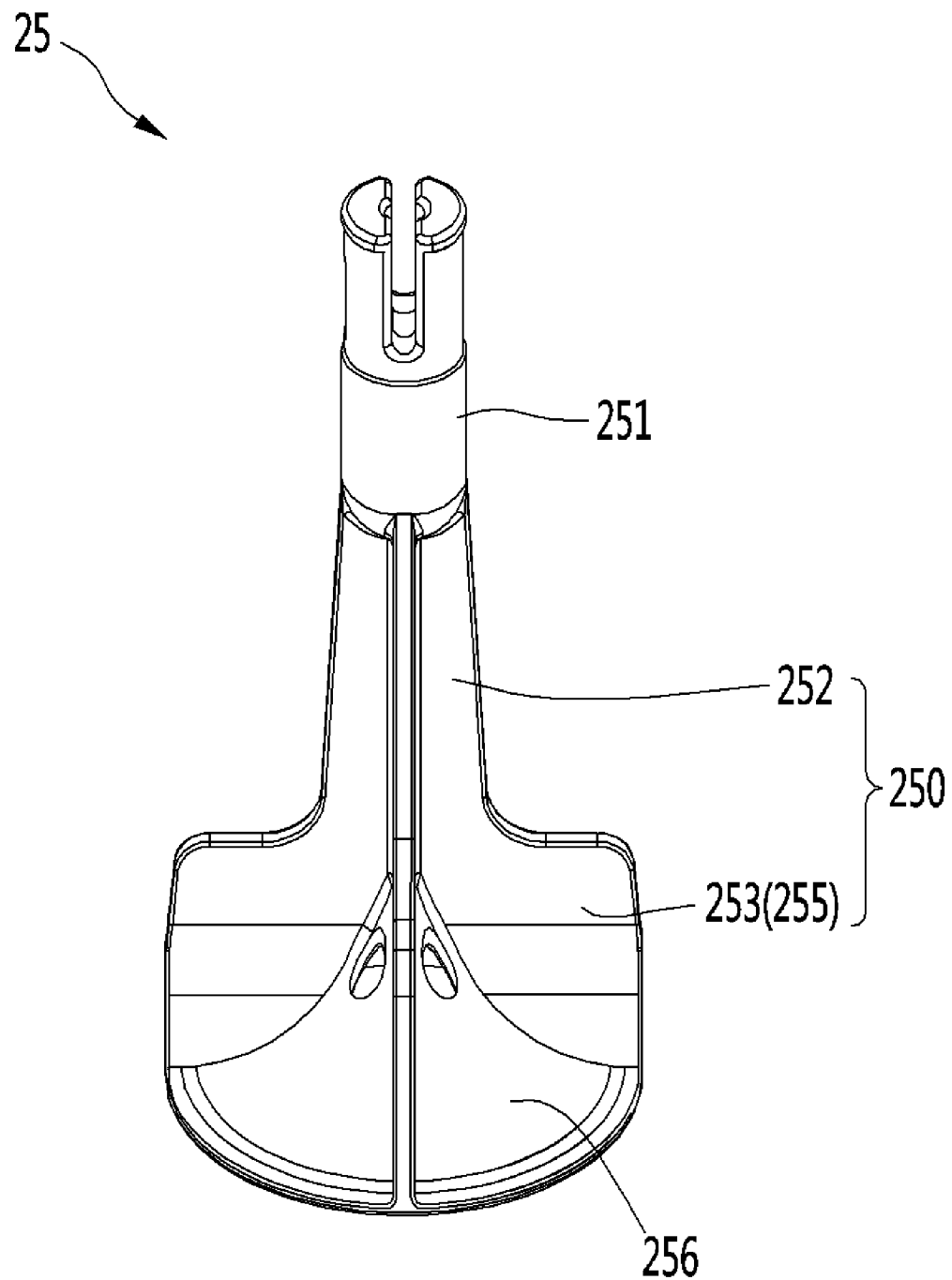
FIG. 13 is a perspective view showing a stirrer according to a second embodiment of the present disclosure.

FIG. 13 is a perspective view showing a stirrer 25 according to a second embodiment of the present disclosure. The stirrer 25 in this second embodiment is the similar to the stirrer 25 of the first embodiment shown in FIGS. 10 to 12 but generally excludes the bending portion 254 of the blades 255. Accordingly, only certain aspects of the specific configuration of this second embodiment are described hereafter, and the first embodiment may be referred to for other, similarly configured aspects of the second embodiment.

Referring to FIG. 13, the stirrer 25 according to the second embodiment of the present disclosure includes a stirring shaft 251 coupled to the rotary shaft of the stirring motor 27 to rotate a plurality of mixing wings 250 extending from the lower end of the stirring shaft 251 and spaced at a predetermined from each other around the stirring shaft 251. The stirrer 25 further includes a substantially conical hub 256 connecting the lower ends of the mixing wings 250.

In detail, the mixing wings 250 each have a body 252 extending downward from the lower end of the stirring shaft 251, and a blade 255 extending from the lower end of the body 252 and in the radial direction from the hub 256. The blades 255 each also have an extension 253 extending in the radial direction of the hub 256 from the lower ends of the body 252 and positioned in substantially the same vertical plane as the body 252.

The hub 256 is formed at the lower ends of the extensions 253 to generate a radial water flow, when the stirrer 25 is rotated, toward the spirally wound cold water pipe 22. In detail, the hub 256 may have a substantially conical shape outer surface that connects to the lower interior ends of the extensions 253. In the example shown in FIG. 13, substantially all of the lower ends of the extensions 253 are connected to the top surface of the hub 256, but in another example shown in FIG. 8, only a portion of the lower ends of the extensions 253 are connected to the top surface of the hub 256. The outer diameter of the bottom of the hub 256 may correspond to the outer diameter of the lower ends of the blades 255, but in other examples, the outer diameter of the bottom of the hub 256 may be larger or smaller than the outer diameter of the blades 255. The hub 256 secures the lower ends of the blades 255 to prevent the lower ends of the blades 255 from shaking or vibrating when the stirrer 25 is rotated. Accordingly, when the stirrer 25 is rotated, resonance noise due to shaking of the blades 255 may be minimized.

Figure 14:
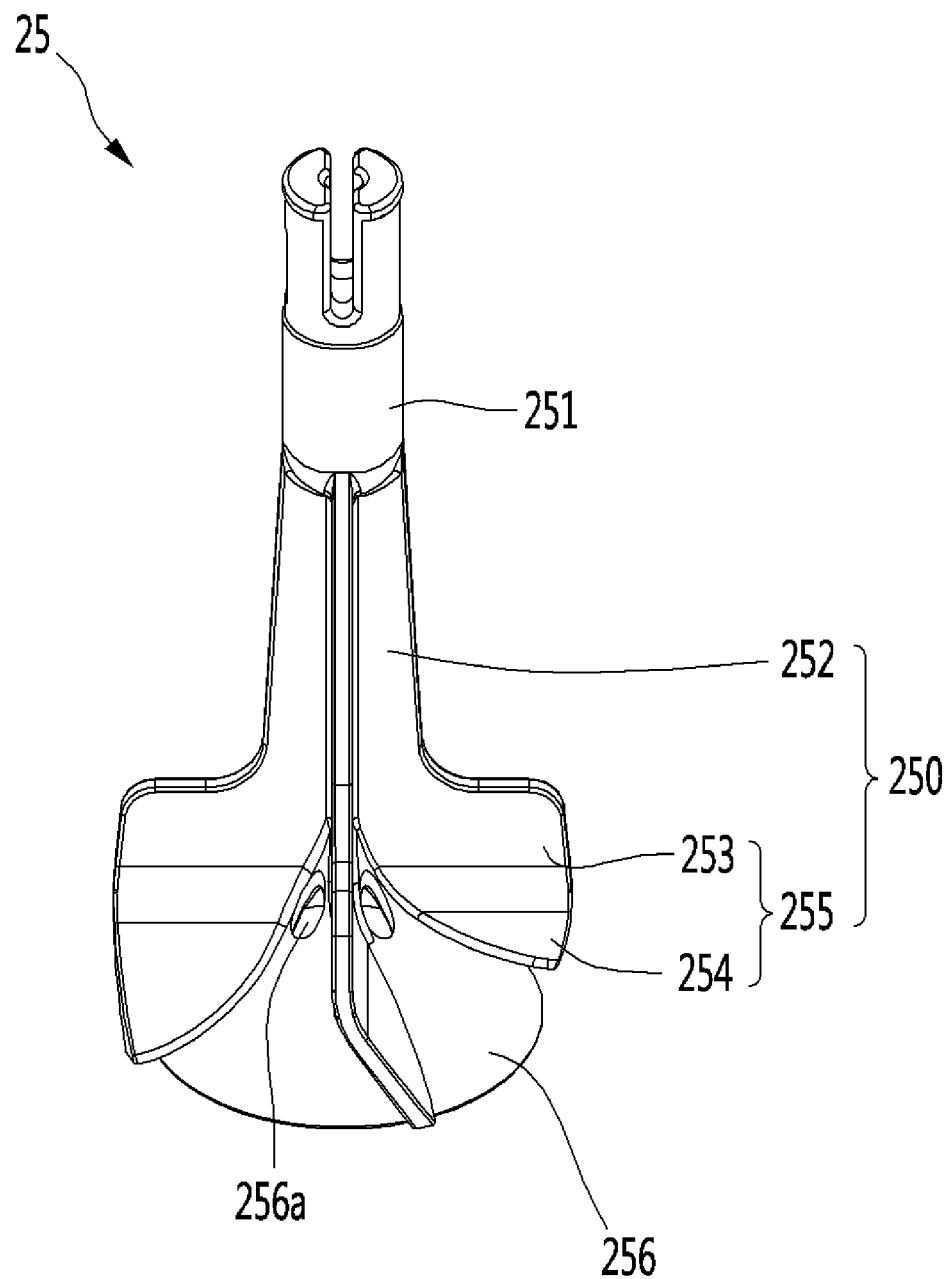
FIG. 14 is a perspective view showing a stirrer according to a third embodiment of the present disclosure.

FIG. 14 is a perspective view showing a stirrer 25 according to a third embodiment of the present disclosure. The stirrer 25 in this embodiment is the similar to the stirrer 25 in the first embodiment except that the hub 256 has an outer diameter that is relative smaller than an outer diameter of the blades 255. Accordingly, only certain aspects of the specific configuration of this third embodiment are described hereafter, and the first embodiment may be referred to for other, similarly configured aspects of the stirrer 25 of the third embodiment.

Referring to FIG. 14, the stirrer 25 according to the third embodiment of the present disclosure includes a stirring shaft 251 coupled to the rotary shaft of the stirring motor 27 to rotate a plurality of mixing wings 250 extending from the lower end of the stirring shaft 251 and spaced at a predetermined from each other around the stirring shaft 251. The stirrer further includes a conical hub 256 connecting the lower ends of the mixing wings 250. In detail, the mixing wings 250 each have a body 252 extending downward from the lower end of the stirring shaft 251 and a blade 255 extending from the lower end of the body 252 and extending in the radial direction of the hub 256.

The blades 255 extend in the radial direction of the hub 256 from the lower ends of the bodies 252, and each of the blades 255 has an extension 253 positioned in the same vertical plane as the body 252 and a bending portion 254 extending in the circumferential direction of the hub 256 from the lower end of the extension 253. The hub 256 is formed at the lower ends of the bending portions 254 to generate a radial water flow, when the stirrer 25 is rotated, toward the cold water pipe 22. In detail, the hub 256 may have a substantially conical, inclined outer shape connected to corresponding lower interior ends of the extensions 253 and/or bending portions 254. The hub 256 holds the lower ends of the blades 255 to prevent the lower ends of the blades 255 from shaking when the stirrer 25 is rotated.

The outer diameter of the bottom of the hub 256 may be smaller than the outer diameter of the lower ends of the blades 255. For example, the outer surface of the hub 256 may extend to contact the interior edges of the extensions 253 but only a portion of the interior edges of the bending portions 254. According to this configuration of the present disclosure, resonance noise due to shaking of the blades 255 when the stirrer 25 is rotated is minimized, while a contact area between cooling water and the hub is also reduced. Therefore, flow resistance of the cooling water against the hub 256 is reduced, so the cooling water may more smoothly circulate within the cooling tank 21.

Figure 15:
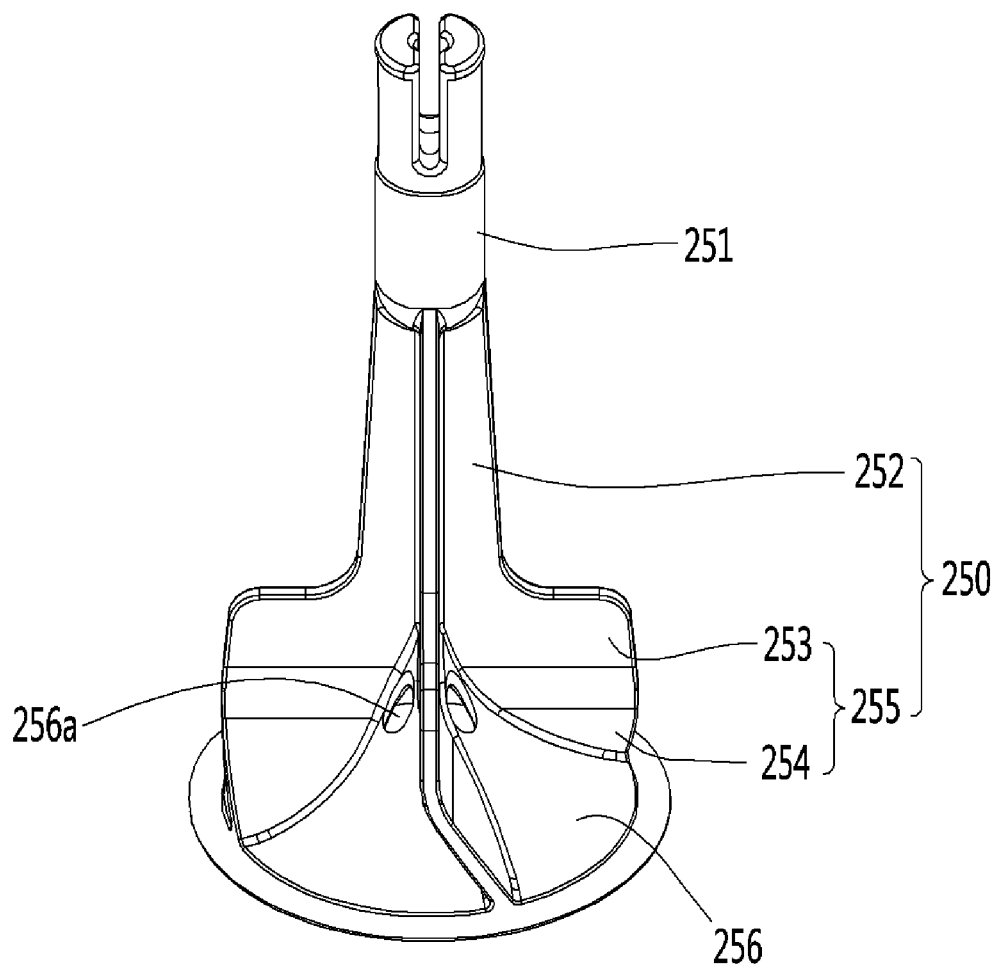
FIG. 15 is a perspective view showing a stirrer according to a fourth embodiment of the present disclosure.

FIG. 15 is a perspective view showing a stirrer 25 according to a fourth embodiment of the present disclosure. The stirrer 25 in the fourth embodiment is similar to the stirrer 25 in the first embodiment except that the stirrer 25 in the fourth embodiment includes a hub 256 having an outer diameter that is larger than the diameter of the blades 255. Accordingly, only certain aspects of the specific configuration of this fourth embodiment are described hereafter, and the first embodiment may be referred to for other, similarly configured aspects of the stirrer 25 of the fourth embodiment.

Referring to FIG. 15, the stirrer 25 according to the fourth embodiment of the present disclosure includes a stirring shaft 251 coupled to the rotary shaft of the stirring motor 27 to rotate a plurality of mixing wings 250 extending from the lower end of the stirring shaft 251 and spaced at a predetermined from each other around the stirring shaft 251. The stirrer 25 further includes a conical hub 256 connecting the lower ends of the mixing wings 250.

In detail, the mixing wings 250 each have a body 252 extending downward from the lower end of the stirring shaft 251 and a blade 255 extending downward from the lower end of the body 252 and extending in the radial direction of the hub 256. The blades 255 extend in the radial direction of the hub 256 from the lower ends of the bodies 252 and each have an extension 253 positioned in the same vertical plane as the body 252. Each of the blades 255 also has a bending portion 254 radially extending outward from the hub 256 and further extending in the circumferential direction of the hub 256 from the lower end of the extension 253.

The hub 256 is formed at the lower ends of the bending portions 254 to generate a water flow, when the stirrer 25 is rotated, toward the cold water pipe 22. In detail, the hub 256 may have a substantially conical shape connecting the lower ends of the extensions 253. The hub 256 holds the lower ends of the blades 255 to prevent the lower ends of the blades 255 from shaking when the stirrer 25 is rotated. The outer diameter of the bottom of the hub 256 may be larger than the outer diameter of the lower ends of the blades 255. For example, the outer surface of the hub 256 may contact the interior edges of the extensions 253 and the interior edges of the bending portions 254, and may further extend beyond the outer edge of the bending portions 254. According to this configuration of the present disclosure, resonance noise due to shaking of the blades 255 caused when the stirrer 25 is rotated is minimized since the hub secures the lower ends of the blades 255. Also, the extended hub causes the cooling water to be radially spread widely through the cooling tank 25 such that the cooling water can more smoothly circulate.

Aspects of the present disclosure provide a cooling water stirrer that reduces resonance noise due to a shaking of blades on the stirrer when the stirrer is rotated, and a water purifier having the cooling water stirrer. Aspects of the present disclosure also provide a cooling water stirrer that more effectively circulates water by generating a widely spreading radial water flow when a stirrer is rotated, and a water purifier having the cooling water stirrer. Aspects of the present disclosure further provide a cooling water stirrer that does not generate noise due to bubbles by preventing bubbles from being generated therein when rotating, and a water purifier having the cooling water stirrer.

A stirrer according to an aspect includes: a stirring shaft; a plurality of mixing wings extending from the lower end of the stirring shaft and spaced from each other around the stirring shaft; and a conical hub connecting the lower ends of the mixing wings.

The mixing wing each may have: a body extending downward from the lower end of the stirring shaft; and a blade bending from the lower end of the body and extending in the radial direction of the hub. The blades each may have: an extension extending in the radial direction of the hub from the lower end of the body and positioned in the same vertical plane as the body; and a bending portion extending radially and in the circumferential direction of the hub.

A water purifier according to one aspect includes: a cooling tank keeping cooling water; a separator dividing the cooling water tank into an upper space and a lower space; an evaporator provided in the upper space; a cold water pipe provided in the lower space; the stirrer provided in the lower space; and a stirring motor rotating the stirrer.

According to another aspect, a stirrer comprises a shaft; a hub having a conical outer surface; and a plurality of vanes extending between the shaft and the hub, the vanes being circumferentially spaced from each other around a central axis of the stirrer, and having lower ends connecting to the hub.

According to another aspect, a water purifier comprises a tank to hold a fluid; a stirrer provided in the tank to contact the fluid, the stirrer including: shaft; a hub having a conical outer surface; and a plurality of vanes extending between the shaft and the hub, the vanes being circumferentially spaced from each other around a central axis of the stirrer and having lower ends connecting to the hub; and a motor coupled to the stirrer and providing a rotating force to the stirrer.

It should be understood that the present disclosure may be modified in various ways within the scope of the present disclosure by those skilled in the art and the scope of the present disclosure should be construed on the basis of claims.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid cooler comprising:
   a cooling tank to hold a first fluid in an inner space;
   a separator provided in the inner space of the cooling tank;
   a motor support provided at a top of the cooling tank to cover the cooling tank;
   a motor provided at an upper side of the motor support and having a rotary shaft extending downward through the motor support;
   an evaporator provided in an upper space in the separator, the evaporator being spirally wound to form a first cylindrical space;
   a pipe provided in a lower space below the separator, the pipe being spirally wound several times horizontally to form a second cylindrical space; and
   a stirrer coupled to the rotary shaft, the stirrer including:
      a stirring shaft coupled to the rotary shaft;
      body extensions extending downward from a lower end of the stirring shaft; and
      blades radially extending from, respectively, corresponding lower ends of the body extensions, the blades being positioned in an inner space of the second cylindrical space,
   wherein the separator includes:
      a bottom layer that is horizontally formed and has a center hole through which the stirrer passes;
      a first extension having a plurality of first vertical ribs extending upward from an edge of the center hole; and
      a second extension having a plurality of second vertical ribs extending upward from an edge of the bottom layer,
      wherein the bottom layer is provided between the evaporator and the pipe,
      wherein the bottom layer includes latticed ribs, and the upper space and the lower space communicate through holes formed between the latticed ribs,
      wherein the evaporator is positioned between the first extension and the second extension, and
      wherein the first extension is inserted into the first cylindrical space of the evaporator.

2. The liquid cooler of claim 1, wherein the stirrer further includes:
   a hub having a conical outer surface; and
   plurality of vanes extending between the stirring shaft and the hub, the plurality of vanes being circumferentially spaced from each other around a central axis of the stirrer, and lower ends of the plurality of vanes being connected to the hub, and
   wherein each of the plurality of vanes has, respectively, one of the body extensions and one of the blades.

3. The liquid cooler of claim 2, wherein each of the blades has, respectively, a blade extension and a bending extension,
   the blade extensions extending radially from the hub and from the lower ends of the body extensions, the blade extensions being positioned in same vertical planes as the body extensions; and
   the bending extensions extending radially from the hub and inclined at an angle in a circumferential direction of the hub, wherein lower ends of the bending extensions extend along the outer surface of the hub.

4. The liquid cooler of claim 3, wherein an angle between a line extending along a top edge of one of the blade extensions and central axis is 90°.

5. The liquid cooler of claim 3, wherein the circumferential direction in which the bending extensions extend along the hub is opposite to a rotational direction of the motor.

6. The liquid cooler of claim 4, wherein the angle between one of the bending extensions and a vertical plane passing through the central axis is 30°.

7. The liquid cooler of claim 3, wherein a plurality of air holes are formed through the hub, and each of the plurality of air holes is formed between an adjacent pair of the plurality of vanes.

8. The liquid cooler of claim 7, wherein each of the plurality of air holes is formed closer to a center of the hub than to a peripheral edge of the hub.

9. The liquid cooler of claim 3, wherein an outer diameter of a peripheral edge of the hub is larger than an outer diameter of the lower ends of the bending extensions of the blades.

10. The liquid cooler of claim 3, wherein an outer diameter of a peripheral edge of the hub is smaller than an outer diameter of the lower ends of the bending extensions of the blades.

11. The liquid cooler of claim 3, wherein an outer diameter of a peripheral edge of the hub corresponds to an outer diameter of the lower ends of the bending extensions of the blades.

12. The liquid cooler of claim 1, wherein the separator divides the cooling tank into the upper space and the lower space.

13. The liquid cooler of claim 2, wherein a lower surface of the hub defines a hollow conical opening at a lower end of the stirrer.

14. The liquid cooler of claim 1, wherein the evaporator carries a refrigerant to cool the first fluid,
   wherein the pipe carries a second fluid to be cooled by the first fluid, and
   wherein the second fluid is water that is passed through a filter assembly.

15. The liquid cooler of claim 12, wherein the separator further includes:

a plurality of separation walls that extend upward from the bottom layer and are positioned around the center hole.

16. The liquid cooler of claim 15, wherein the separation walls include seating grooves to receive the evaporator.

17. The liquid cooler of claim 15, wherein the stirring shaft is provided within the first extension.

18. The liquid cooler of claim 2, wherein the hub and the plurality of vanes are provided below the bottom layer of the separator.

19. The liquid cooler of claim 1, wherein the cooling tank includes holder ribs that extend upward from a lower surface of the cooling tank to form a seating groove to receive a lower end of the pipe, wherein the stirrer is provided above the holder ribs.

20. The liquid cooler of claim 2, wherein the stirring shaft is provided in the first cylindrical space, and the hub and the plurality of vanes are provided in the second cylindrical space.

21. The liquid cooler of claim 2, wherein the stirring shaft has a coupling groove recessed downwardly at an upper surface thereof, and
   wherein the rotary shaft of the motor is coupled to the coupling groove of the stirring shaft.

22. The liquid cooler of claim 1, wherein the upper space in the separator, in which the evaporator is provided, is defined between the first extension and the second extension.

* * * * *